(12) United States Patent
Roundtree

(10) Patent No.: US 7,539,484 B2
(45) Date of Patent: *May 26, 2009

(54) METHOD AND SYSTEM FOR ENHANCING VOICE CALLS, SUCH AS ENHANCING VOICE CALLS WITH DATA SERVICES

(75) Inventor: Brian Roundtree, Kirkland, WA (US)

(73) Assignee: SNAPin Software Inc., Bellevue, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 11/672,499

(22) Filed: Feb. 7, 2007

(65) Prior Publication Data

US 2007/0173237 A1    Jul. 26, 2007

Related U.S. Application Data

(60) Provisional application No. 60/883,609, filed on Jan. 5, 2007, provisional application No. 60/771,514, filed on Feb. 7, 2006.

(51) Int. Cl.
*H04Q 7/22* (2006.01)

(52) U.S. Cl. .................... 455/414.1; 455/415; 455/419; 455/3.04; 370/328; 370/338

(58) Field of Classification Search .............. 455/414.1, 455/415, 419, 3.04; 370/328, 338
See application file for complete search history.

(56) References Cited

U.S. PATENT DOCUMENTS

| 5,475,735 | A | 12/1995 | Williams et al. |
| 5,675,628 | A | 10/1997 | Hokkanen |
| 5,790,798 | A | 8/1998 | Beckett, II et al. |
| 5,845,211 | A | 12/1998 | Roach, Jr. |
| 6,031,467 | A | 2/2000 | Hymel et al. |
| 6,199,045 | B1 | 3/2001 | Giniger et al. |
| 6,219,047 | B1 | 4/2001 | Bell |
| 6,301,480 | B1 | 10/2001 | Kennedy, III et al. |
| 6,368,205 | B1 | 4/2002 | Frank et al. |
| 6,370,399 | B1 | 4/2002 | Phillips |
| 6,424,945 | B1 | 7/2002 | Sorsa et al. |

(Continued)

FOREIGN PATENT DOCUMENTS

EP    1387241    2/2004

(Continued)

OTHER PUBLICATIONS

International Search Report for International Application No. PCT/US08/50447, dated Apr. 10, 2008, Applicant SNAPin Software Inc.

(Continued)

*Primary Examiner*—Nghi H Ly
(74) *Attorney, Agent, or Firm*—Perkins Coie LLP

(57) ABSTRACT

A method and system for enhancing voice calls is described. In some examples, the system receives a dialed number from a user associated with a voice call, determines that the voice call is associated with a party capable of providing data services to the user, and provides data services to the user. In some cases, the system provides the data services to the user during the voice call. In some cases, the system provides the data services to the user in lieu of the voice call.

22 Claims, 20 Drawing Sheets

U.S. PATENT DOCUMENTS

| | | | |
|---|---|---|---|
| 6,430,407 | B1 | 8/2002 | Turtiainen et al. |
| 6,496,979 | B1 | 12/2002 | Chen et al. |
| 6,615,038 | B1 | 9/2003 | Moles et al. |
| 6,618,478 | B1 | 9/2003 | Stuckman et al. |
| 6,646,570 | B1 | 11/2003 | Yamada et al. |
| 6,654,594 | B1 | 11/2003 | Hughes et al. |
| 6,668,169 | B2 | 12/2003 | Burgan et al. |
| 6,766,017 | B1 | 7/2004 | Yang et al. |
| 6,792,280 | B1 | 9/2004 | Hori et al. |
| 6,909,910 | B2 | 6/2005 | Pappalardo et al. |
| 6,940,844 | B2 | 9/2005 | Purkayastha et al. |
| 6,944,447 | B2 | 9/2005 | Portman et al. |
| 6,970,698 | B2 | 11/2005 | Majmundar et al. |
| 7,177,665 | B2 | 2/2007 | Ishigaki et al. |
| 7,194,257 | B2 * | 3/2007 | House et al. ............... 455/418 |
| 7,353,016 | B2 * | 4/2008 | Roundtree et al. ....... 455/414.1 |
| 2002/0034940 | A1 | 3/2002 | Takae et al. |
| 2002/0065109 | A1 | 5/2002 | Mansikkaniemi et al. |
| 2002/0112172 | A1 | 8/2002 | Simmons |
| 2002/0128036 | A1 | 9/2002 | Yach et al. |
| 2002/0152229 | A1 | 10/2002 | Peng |
| 2003/0039948 | A1 | 2/2003 | Donahue |
| 2003/0053615 | A1 | 3/2003 | Anderson et al. |
| 2003/0112931 | A1 | 6/2003 | Brown et al. |
| 2003/0204725 | A1 | 10/2003 | Itoi et al. |
| 2004/0005051 | A1 | 1/2004 | Wheeler et al. |
| 2004/0142720 | A1 | 7/2004 | Smethers |
| 2004/0172561 | A1 | 9/2004 | Iga |
| 2004/0193444 | A1 | 9/2004 | Hufford et al. |
| 2006/0003758 | A1 | 1/2006 | Bishop et al. |
| 2006/0245391 | A1 | 11/2006 | Vaidya et al. |
| 2007/0173237 | A1 | 7/2007 | Roundtree |

FOREIGN PATENT DOCUMENTS

| | | |
|---|---|---|
| GB | 2365711 | 2/2002 |
| JP | 10084404 | 3/1998 |
| JP | 11259199 | 9/1999 |
| JP | 2003067334 | 3/2003 |
| WO | WO-9707641 | 2/1997 |
| WO | WO-0070888 | 11/2000 |
| WO | WO-0186472 | 11/2001 |

OTHER PUBLICATIONS

3rd Generation Partnership Project. "Specification of the SIM Application Toolkit for the Subscriber Identity Module—Mobile Equipment (SIM-ME) Interface (Release 1999)," 3GPP Organizational Partners, 2004, 143 pages.

Center for Customer Driven Quality at Purdue University, "It's the Solution, Stupid," 2004 2 pages.

European Search Report for European Application No. 05713762.2, dated Jun. 27, 2008, Applicant SNAPin Software Inc.

Gartner, Contact Center Investment Strategy and Leading Edge Technologies, http://www.gartner.com/4_decision_tools/measurements/measure_it_articles/2002_12/contact_center_investment_strategy.jsp, accessed on Jul. 8, 2008, 4 pages.

International Search Report for International Application No. PCT/US05/33973, dated Apr. 19, 2006, Applicant SNAPin Software Inc.

International Search Report for International Application No. PCT/US05/5517, dated Jul. 6, 2005, Applicant SNAPin Software Inc.

International Search Report for International Application No. PCT/US06/24637, dated Aug. 1, 2007, Applicant SNAPin Software Inc.

International Search Report for International Application No. PCT/US06/40398, dated Jul. 15, 2008, Applicant SNAPin Software Inc.

International Search Report for International Application No. PCT/US07/61806, dated Feb. 13, 2008, Applicant SNAPin Software Inc.

Japanese Office Action dated Jun. 16, 2008 under Japanese Patent Application 2006-554217, 10 pages.

U.S. NonFinal Office Action dated Jul. 23, 2008 under U.S. Appl. No. 11/672,499, 11 pages.

International Search Report for International Application No. PCT/US05/05135, dated Oct. 26, 2006, Applicant SNAPin Software Inc.

U.S. NonFinal Office Action dated Jan. 26, 2006 under U.S. Appl. No. 11/063,663, 17 pages.

U.S. NonFinal Office Action dated Aug. 16, 2006 under U.S. Appl. No. 11/063,663, 15 pages.

U.S. NonFinal Office Action dated Sep. 17, 2007 under U.S. Appl. No. 11/063,663, 8 pages.

* cited by examiner

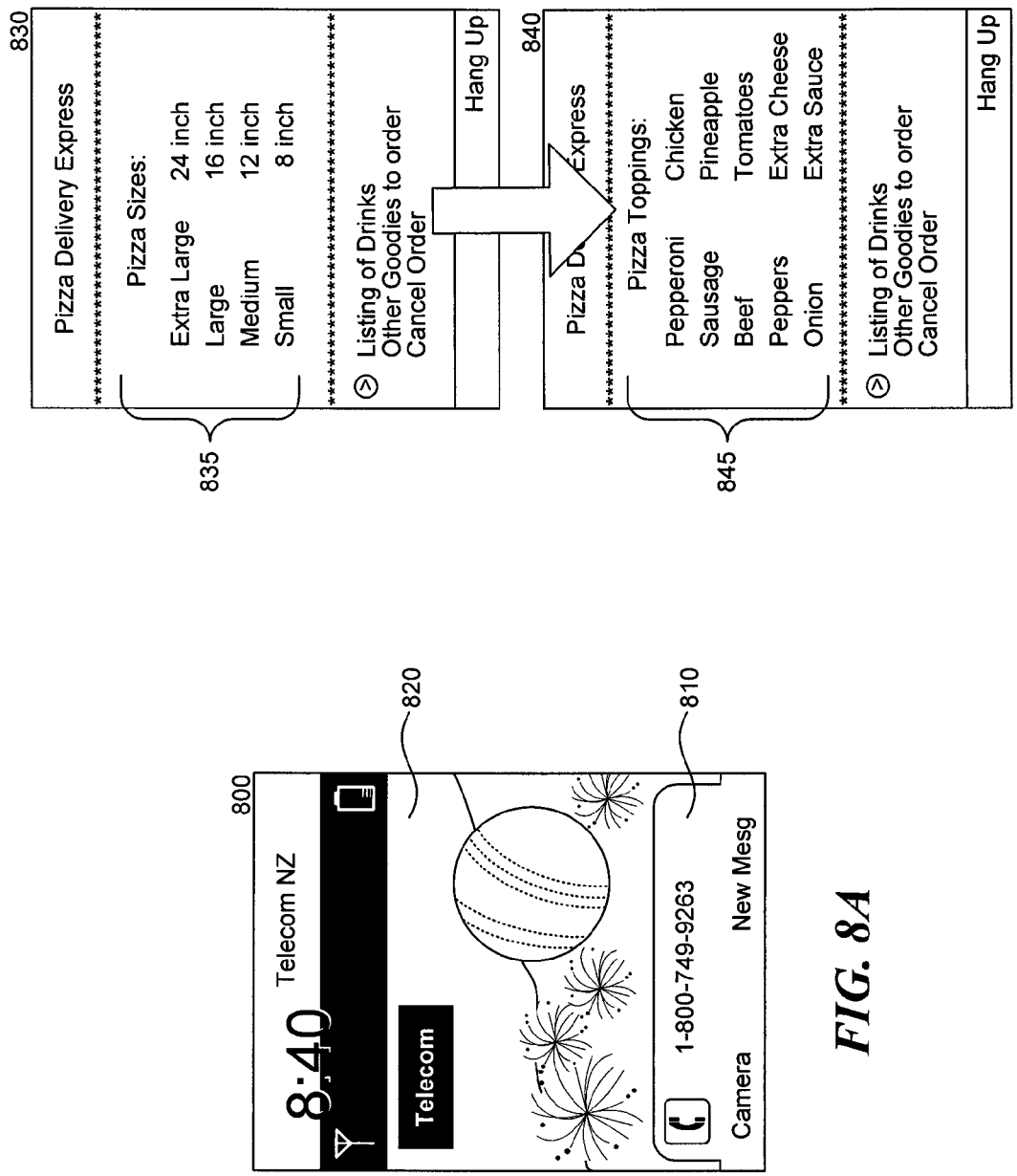

FIG. 14

METHOD AND SYSTEM FOR ENHANCING VOICE CALLS, SUCH AS ENHANCING VOICE CALLS WITH DATA SERVICES

CROSS-REFERENCE TO RELATED APPLICATION(S)

This application claims priority to assignee's U.S. Provisional Patent Application 60/771,514, filed Feb. 7, 2006, entitled METHOD FOR PERFORMING INTERACTIVE SERVICES ON MOBILE DEVICE, SUCH AS TIME OR LOCATION INITIATED INTERACTIVE SERVICES and U.S. Provisional Patent Application No. 60/883,609, filed Jan. 5, 2007, entitled CALL INTERCEPT METHODS, SUCH AS INTERACTIVE VOICE RESPONSE NAVIGATION, each of which is hereby incorporated by reference in its entirety.

BACKGROUND

The use of mobile devices has rapidly increased in recent years. This increase is due in part to services available on mobile devices. In addition to traditional voice calls, mobile devices allow users to communicate via email, text messaging, instant messaging, and so on. Some mobile devices provide music playback, video playback, games, photo taking and sharing and other content, often interacting with users via full color displays.

Despite these additional capabilities, users place (or receive) voice calls using their mobile devices without utilizing such capabilities. That is, when using a mobile device to communicate over a data channel (such as a text message), a user may utilize and send a photo with the text message, synergizing several different capabilities of the mobile device. In contrast, users do not utilize other capabilities of the mobile device during voice communications.

These and other problems exist with respect to the current use of mobile devices.

BRIEF DESCRIPTION OF THE DRAWINGS

FIGS. 8A-8C shows display screens illustrating an example of providing an enhanced data call.

FIG. 14 is an example of a computer display showing an enlarged image of the mobile device that includes current contents of the mobile device's display.

Figure 1:
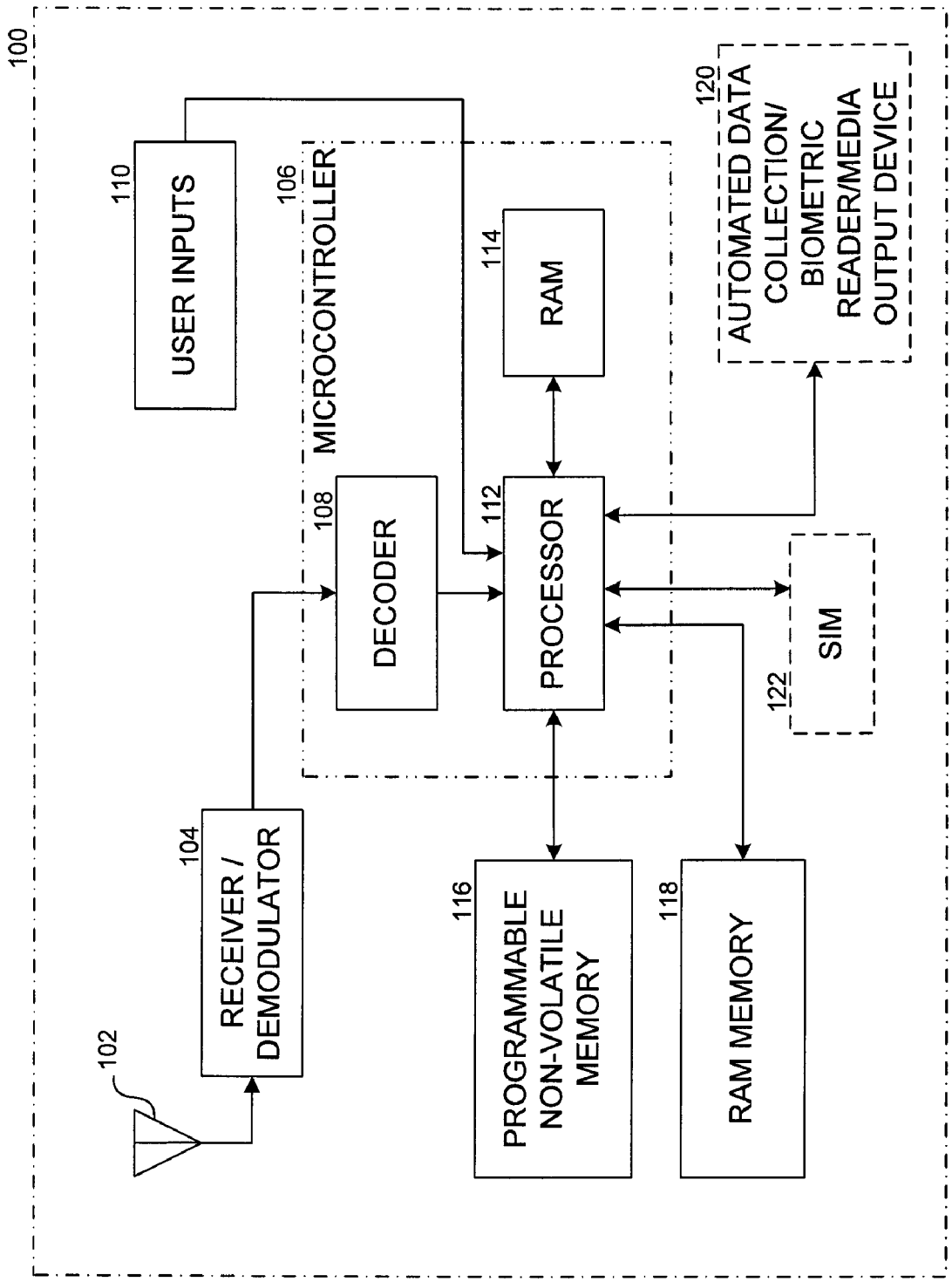
FIG. 1 is a schematic diagram illustrating a mobile device on which call intercept methods and customer self-support can be implemented.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1110 is first introduced and discussed with respect to FIG. 11).

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

A system and method for enhancing voice calls with data services is described. The system may receive an indication of a voice call (such as a dialed number), intercept the voice call to determine if the dialed number is associated with data services, and provide the data services to a user. In some cases, the system may provide data services during an ongoing voice call. In some cases, the system may intercept a voice call, determine that the voice call is associated with data services, end the voice connection, and proceed to a data connection.

The system, upon determining that a voice call is associated with data services, may provide content to a user via a display on the user's mobile device. The system may display graphics or other visual content, songs, tones or other audio content, and other content capable of providing communications to a user.

In some cases, the system augments a voice call with data services. For example, the system may establish a voice call over a voice communications channel between a user of a mobile device and a called party. The called party may be, for example, a retail establishment selling items or providing items for selection by the user. The system may, in addition to the established voice call, provide data content to the user that complements the voice call, such as content directly or indirectly related to contents or subjects within the voice communications (e.g., the system may provide a choice of menu items to a user over the data channel when a user is verbally placing an order for one or more of the items).

In some cases, the system supplements a voice call with data services. For example, the system may establish a voice call between a user and a called party, and then supplement the voice call with data communications. For example, a user may call a party to place an order for an item, and the system may end the voice and establish a data connection between the user and the called party. Then, the user is able to place the order via the mobile device, such as via a display on the mobile device, and send data about the order to the called party. The system may then facilitate the exchange of data, such as displayable content, between the user and the called party until the order has been placed.

Suitable System

FIG. 1 illustrates a mobile device 100 on which call intercept methods can be implemented in accordance with several embodiments of the invention. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122, or other universal integrated circuit card (UICC) such as a universal SIM (USIM) or removable user identity module (RUIM). The output of the processor 112 can be stored in a programmable non-volatile memory 116 or in the RAM memory 118.

Figure 2:
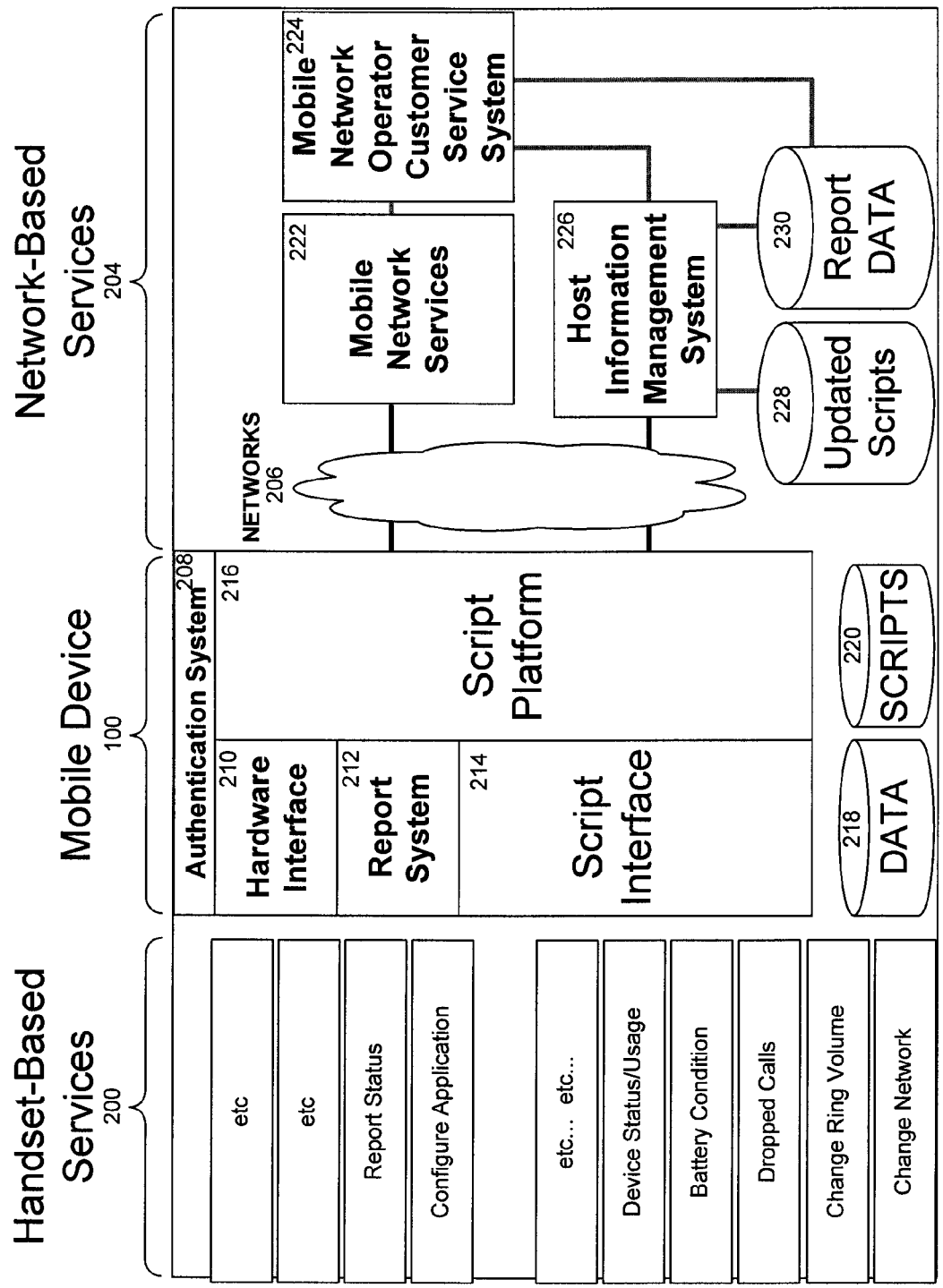
FIG. 2 is a schematic diagram illustrating a system architecture for implementing call intercept methods and customer self-support.

FIG. 2 illustrates a system architecture for implementing call intercept methods. The system architecture includes three components: handset-based services 200, the mobile device 100, and network-based services 204. FIG. 1 and the discussion herein provide a brief, general description of a suitable telecommunications or computing environment in which the invention can be implemented. Although not required, aspects of the invention are described in the general context of computer-executable instructions, such as routines executed by a general-purpose computer, e.g., mobile device, a server computer, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the invention can be embodied in a special purpose computing device or data processor that is specifically programmed, configured, or constructed to perform one or more of the computer-executable instructions explained in detail herein. Aspects of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network. In an alternative embodiment, the mobile device or portable device may represent the server portion, while the server may represent the client portion.

The handset-based services 200 may include executable software, software configurations, hardware configurations and controls, and handset operating system interfaces. As disclosed herein, executable software may include, without limitation, any software program stored on the mobile device or associated memory device, both permanently and temporarily connected via hardware or wireless connectivity. The mobile device 100 may include an authentication system 208 (e.g., via a SIM), a hardware interface 210, a report system 212, a script interface 214, a script platform 216, data 218, and scripts 220. The network-based services 204 may include a network or networks 206, mobile network services 222, a mobile network operator customer service system 224, a host information management system 226, updated scripts 228, and report data 230. The components of the mobile device 100 and the network-based services 204 will be described below.

The components within the mobile device 100 allow the device to integrate both handset-based services 200 and network-based services 204. The authentication system 208 can implement SIM (Subscriber Identity Module) or other UICC card-based or standalone authentication to meet network requirements for desired levels of security. Authenticating a system to meet network requirements may not be required but is often recommended.

The hardware interface 210 may retrieve hardware interface elements required for interfacing with network or phone-based customer support services. Examples of hardware interface elements include changing volume, changing frequency, retrieving SIM (Subscriber Identity Module) ID, connection status from the SIM or radio hardware, and others. The report system 212 may collect and forward the data reported by the mobile device to the network 206. The report system 212 can also encrypt the handset identification information to provide increased security. The information can be encoded so that only the host information management system 226 can decipher the handset identification information.

The script interface 214 serves as a standard application programming interface for customer support services. More specifically, the script interface 214 provides an interface between scripts 220 and the various hardware-specific and executable, program-specific functions. The script interface 214 allows a single customer service script to be deployed across multiple operating systems and hardware configurations. In addition, the script interface 214 includes a standard API (Application Programming Interface) for both the hardware/OS side and the script interface.

The script platform 216 can mix and match calls through the script interface to acquire information, to change or correct settings on the phone, and to perform additional functions as described below. The script platform 216 authenticates, runs, and updates all scripts 220, manages reporting updates and changes, communicates with the host information management system 226, communicates with the GUI (Graphical User Interface), and manages customer surveys and interviews. The host information management system 226 can push a notification to the script platform 216 via USSD (Unstructured Supplementary Services Data), SMS (Short Message Service), IP (Internet Protocol), or any other network connectivity that the mobile device supports. The script platform 216 can run the scripts 220 after authentication, and the scripts 220 can be authenticated to the network 206 or to the phone.

The components within the network-based services 204 allow the mobile device 100 to communicate with and to retrieve data from the network 206. The network-based services 204 may include wired and wireless systems. The mobile network services 222 may consist of one or more systems including billing, CRM (Customer Relationship Management), provisioning, and others. Furthermore, mobile network services 222 are able to return data calls made by mobile devices via standard network protocols (e.g., IP, DTMF (Dual-Tone Multi-Frequency), SMS, USSD, etc.).

The mobile network operator customer service system 224 may also consist of one or more systems relating to customer service, including billing, CRM, provisioning, and others. The host information management system 226 controls interactions between the mobile device and the host customer support system. The host information management system 226 can transmit updates to the mobile device. The mobile device typically employs a unique handset ID or serial number, and a mobile phone number. The report data 230 provides storage for report information gathered from the mobile device. The updated scripts 228 consist of scripts that the host customer support system provides to the mobile device. The updated scripts 228 can be managed and versioned as desired by the host information management system 226, can be targeted at specific subscribers or groups of subscribers, and can include requests for reports and customer interview surveys.

Figure 3:
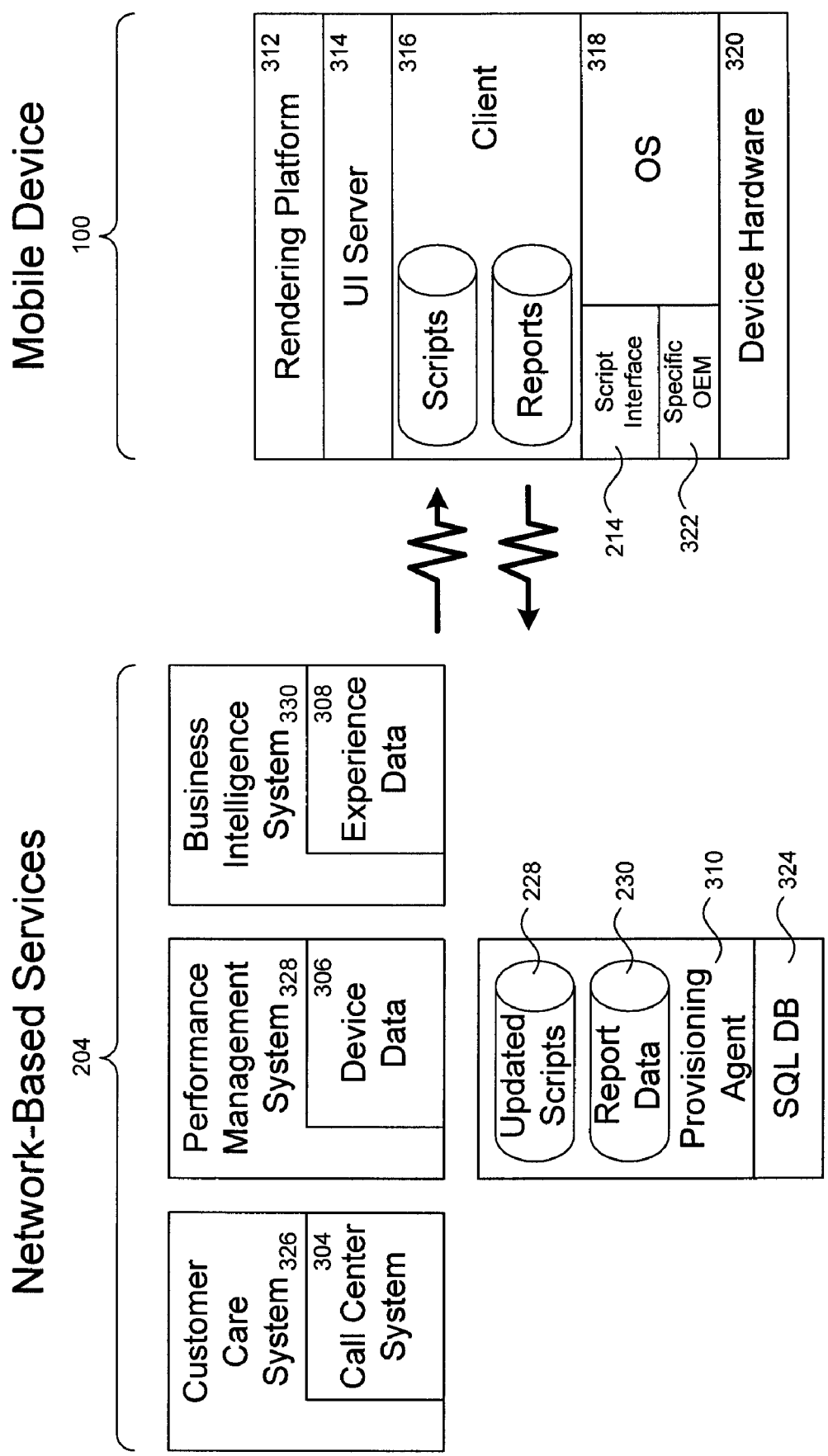
FIG. 3 is a schematic diagram illustrating a system architecture for the network-based services and the mobile device of FIG. 2.

FIG. 3 illustrates a system architecture for the network-based services 204 and the mobile device 100. The network-based services 204 include a call center system 304, device data 306, subscriber experience data 308, and a provisioning agent 310. The call center system 304 may be part of a customer care system 326, the device data 306 may be part of a performance management system 328, and the subscriber experience data 308 may be part of a business intelligence system 330. The call center system 304 can manage settings remotely and can collect data OTA (over the air) from the mobile device 100 without asking the subscriber for permission. The call center system 304 can also automatically collect device data (e.g., handset ID and mobile phone number) 306 and subscriber experience data (e.g., the nature of the customer service problems) 308 from the mobile device 100. The device data 306 and the subscriber experience data 308 may be integrated into network-based services or used standalone.

The provisioning agent 310 interacts with the updated scripts 228 and report data 230. The provisioning agent collects report data 230 associated with the device data 306 and subscriber experience data 308 from the mobile device 100. The provisioning agent also corrects subscriber problems in real-time by transmitting appropriate scripts to the mobile device 100. The transmission of scripts to, and the collection of data from, the mobile device 100 may be hosted within the network or externally. In addition, the updated scripts 228 and the report data 306 may be stored in an SQL (Structured Query Language) database 324. The mobile device 100 may include a rendering platform 312 (e.g., implemented in C++), an optional UI (User Interface) server 314, a client 316, and a script interface 214. The client 316 generates reports containing subscriber data and transmits the reports to the network-based services 204. The client 316 receives scripts 320 from the network-based services 204 that can correct subscriber problems. The script interface 214 allows a single script to be executed by multiple operating systems and hardware configurations. In addition, the mobile device 100 may also include an OS (Operating System) 318, specific OEM (Original Equipment Manufacturer) 322, and device hardware 320. In general, the mobile device scripts or applications may be customized via a European Computer Manufacture's Association (ECMA) compliant scripting language such as JavaScript. Such software can be installed by the manufacturer, or after manufacturing, such as over the air, particularly with open OS-based devices. For proprietary OS-based devices, a small kernel can be installed at the time of manufacturing or flashed onto the device at a later time, and then the full client application can be installed on the mobile device over the air.

Figure 4:
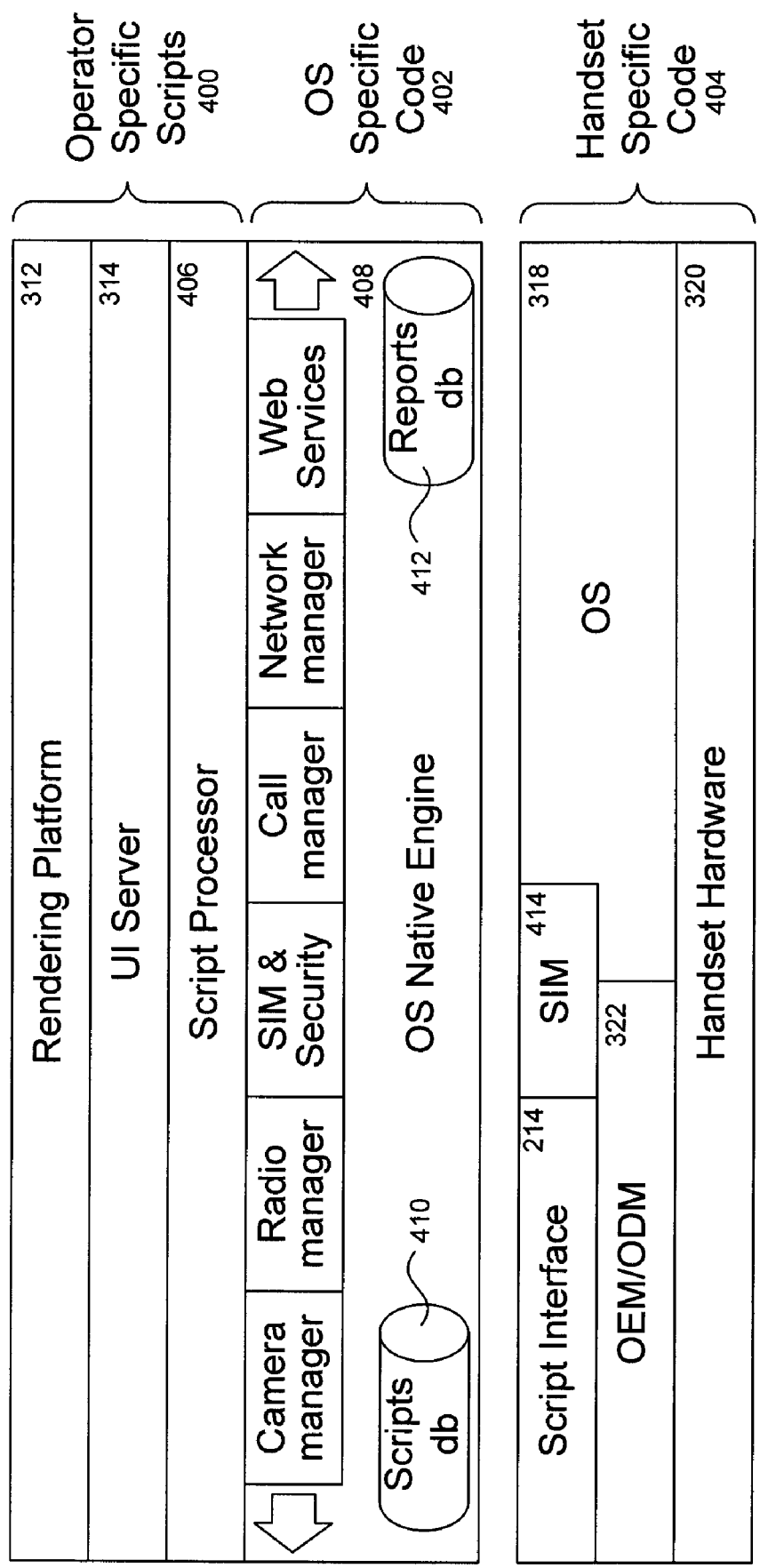
FIG. 4 is a schematic diagram illustrating the architecture for the mobile device of FIG. 1.

FIG. 4 illustrates the architecture for the mobile device 100. The rendering platform 312, the UI server 314, and a script processor 406 handle or are involved in handling operator specific scripts 400. Operator specific scripts 400 may include scripts pertaining to billing information, bill payment, forwarding calls, setting up an online photo album, and others, including those specific to a wireless service provider (such as those providing a preferred user interface). The OS native engine 408, which includes a scripts database 410 and a reports database 412, utilizes OS specific code 402. The script interface 214 utilizes handset specific code 404. Handset specific code 404 may also be applied to a SIM (UICC) 414, an OS 318, specific OEM 322, and handset hardware 320.

Figure 5:
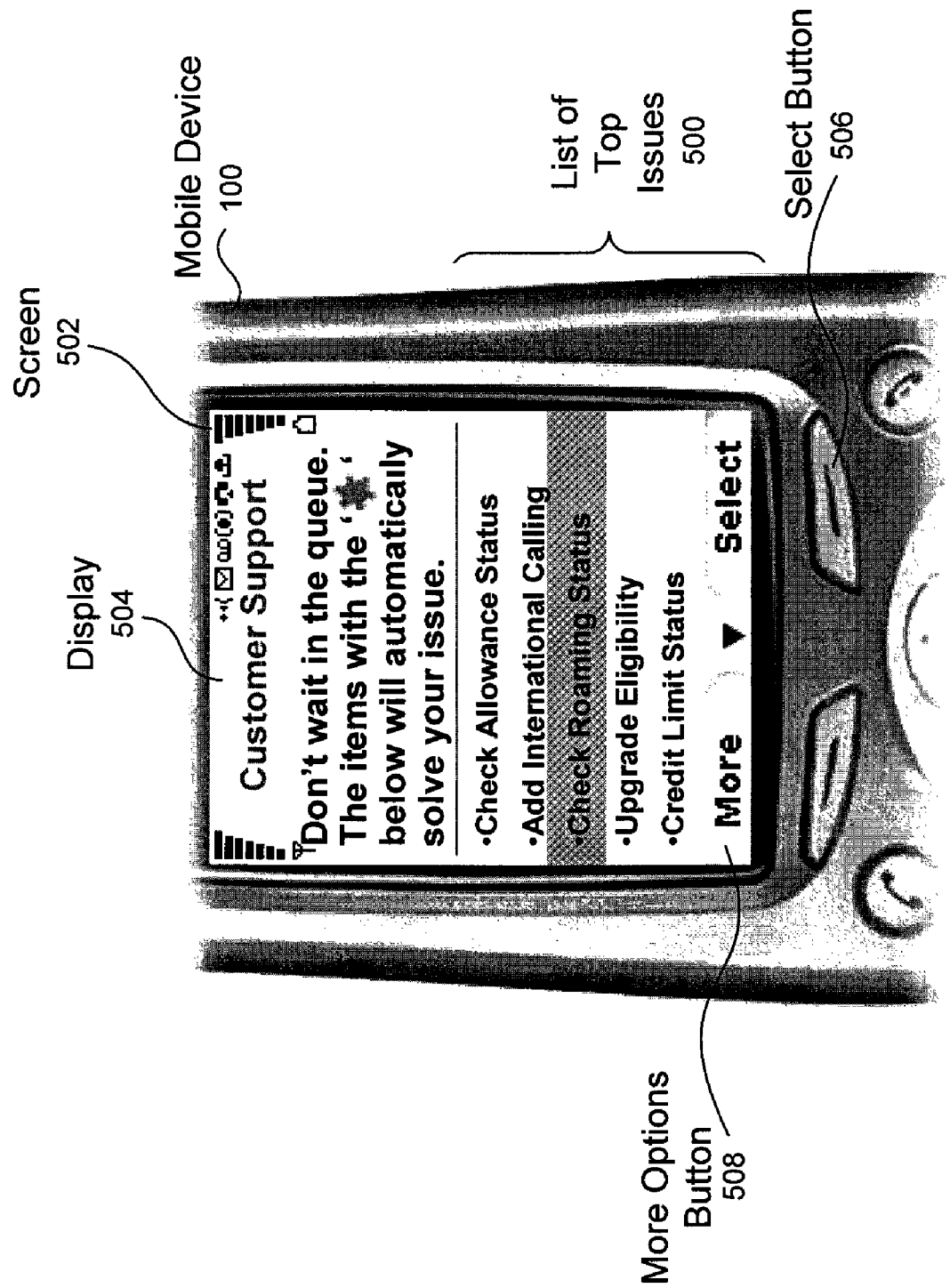
FIG. 5 is a diagram illustrating a display on the mobile device for locally providing customer support.

FIG. 5 illustrates a display 504 on the mobile device 100 for locally providing customer support. Referring to FIG. 5 (and other screen displays), representative phone or computer displays, or web pages, are shown for performing certain tasks described herein. The screens provide facilities to receive input data, such as a form with field(s) to be filled in, menu selections, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

A subscriber may access the display 504 on a screen 502 by dialing a customer support number, such as "611." The display 504 automatically provides the subscriber with a list of top issues or questions 500, which may answer common customer support questions. Subscribers can scroll down on the display 504 using a more options button 508 to view additional issues. Subscribers can select an issue from the list using a select button 506. Selecting an issue allows the mobile device 100 to retrieve relevant data from the local, programmable non-volatile memory 116.

Figure 6A:
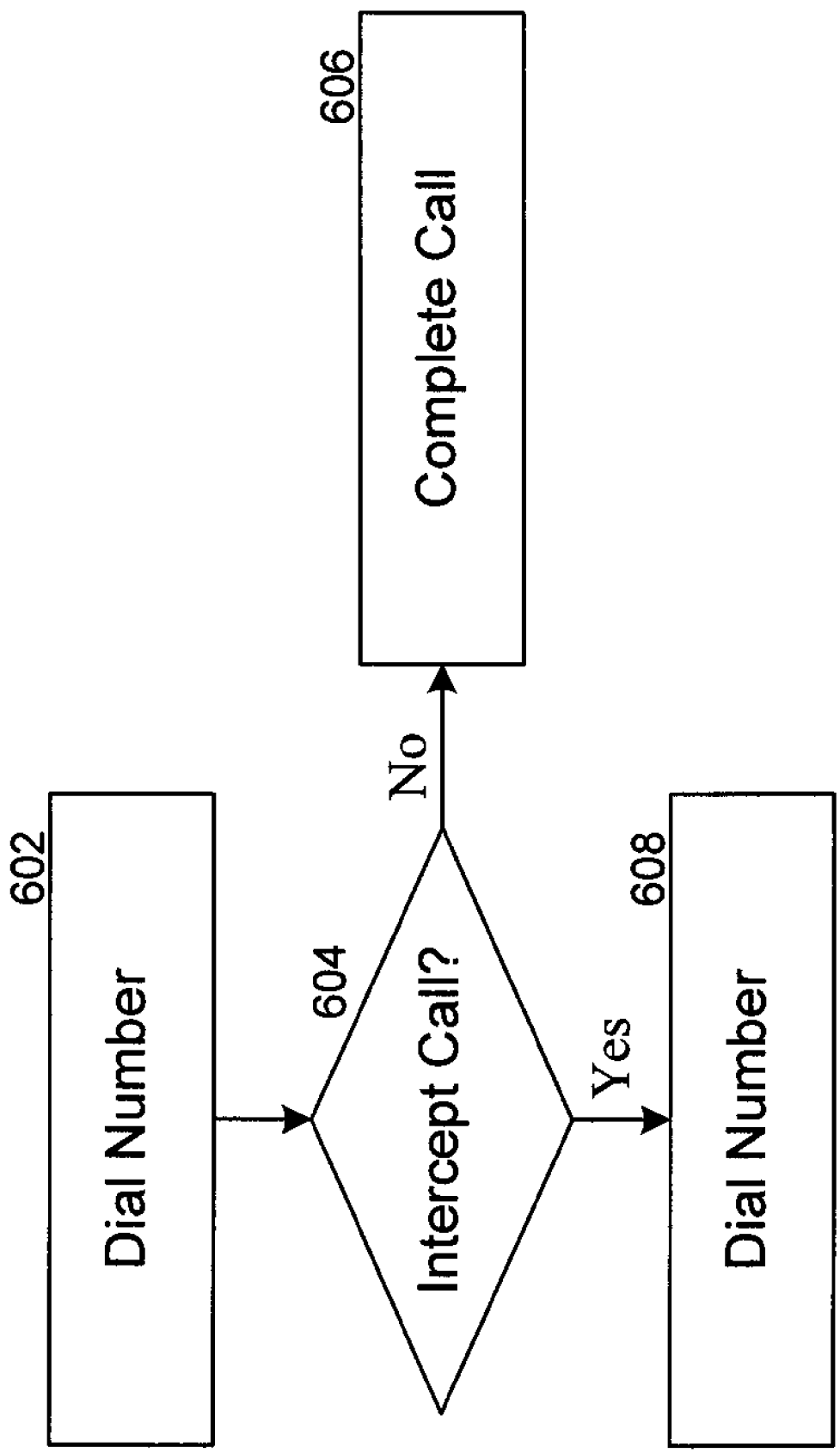
FIG. 6A is a flow diagram illustrating a basic routine for intercepting and redirecting a customer service support call at the mobile device.

FIG. 6A illustrates the basic routine for intercepting and redirecting a customer service support call at the mobile device. In block 602, a subscriber dials a customer service support number, such as "611," to access a customer support call center. The subscriber's mobile device determines locally if the number dialed matches a number stored on the mobile device (block 604). If the number matches, then the mobile device locally intercepts the customer service support call at the mobile device and performs actions at the mobile device (block 608), as described below. In one embodiment, the mobile device may intercept the incoming call and display locally stored content (e.g., series of help screens), or launch a browser to a predetermined webpage via a network connection. If the number does not match, then the mobile device allows the call to be completed to a call center (block 606).

Figure 6B:
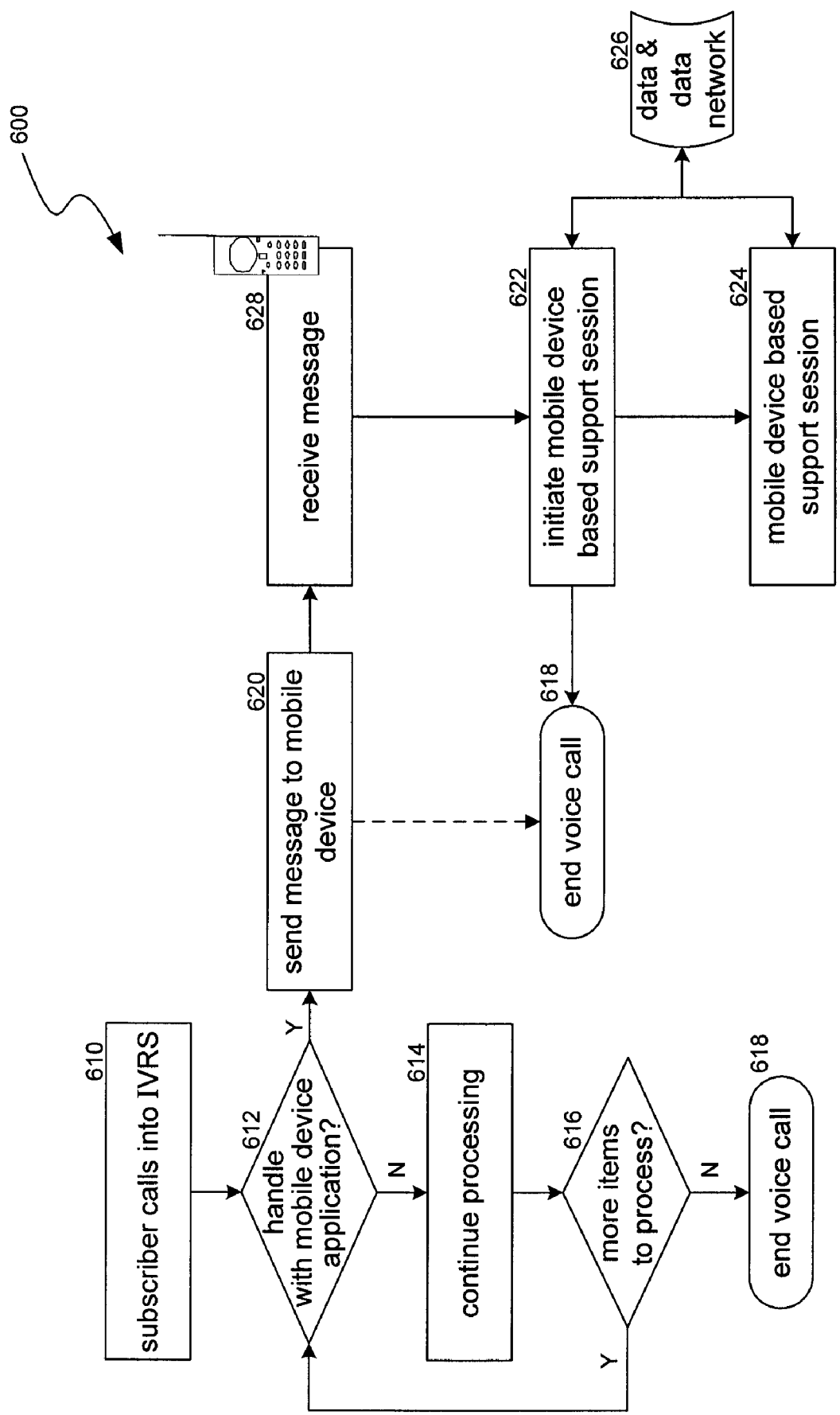
FIG. 6B is a flow diagram illustrating a detailed routine for intercepting and redirecting a customer service support call at the mobile device.

FIG. 6B illustrates a detailed routine 600 for intercepting and redirecting a customer service support call at the mobile device 100. In block 610, a subscriber dials a customer service support number to access a customer support call center. The mobile device 100 determines if the subscriber's call should be locally intercepted and redirected to a mobile device application running on the mobile device or allowed to continue without redirection (block 612). (Alternatively, as described below, the call may be routed to the call center or an interactive voice response system (IVRS), and then bounced back to the mobile device.) The mobile device 100 determines if the number dialed matches a number stored locally in a table. If the number matches, then the call is intercepted. If the subscriber's call is allowed to continue without redirection (block 614), then the call center determines whether more items need to be processed (block 616). If more items need to be processed, then the call center directs the subscriber's call to block 612 to process the call and to determine if the call should be intercepted. If no more items need to be processed, then the subscriber's call ends (block 618).

If the mobile device 100 determines that the subscriber's call should be intercepted at block 612, then the call, along with access information required to route a message to the mobile device, is directed to the mobile device application running on the subscriber's mobile device (block 620). In one embodiment, the mobile device could play sounds or show a dialog on the display to indicate that a call has been intercepted. The mobile device application routes a signaling message, indicating that the subscriber's call has been intercepted, to the customer support call center via network signaling technologies such as SMS or USSD, and may receive a response message back. In block 628, the mobile device 100 receives and processes any signaling message from the mobile device application. The mobile device may also receive certain customer self-support data from the network. In block 622, a customer support session begins on the subscriber's mobile device using locally stored data received from the mobile device application. The mobile device may use a variety of technologies to display and respond to the customer support issue in question. In block 624, the mobile device addresses the subscriber's support issue locally, as described below. In an alternative embodiment, the mobile device retrieves data or scripts from the network to address the subscriber's support issue, as noted above (block 626).

In an alternative embodiment, the call center determines if the subscriber's call should be intercepted and directs the call accordingly. The call center may utilize an IVRS (Interactive Voice Recognition System) to communicate with the subscriber. If the call center determines that the call should not be intercepted, then the call is allowed to continue through the call center for processing (block 614). If the call center determines that the call should be intercepted, then the call is redirected back to the mobile device for local processing (block 620). Thus, if the call goes through to the call center/IVRS, and then is routed back to the mobile device, the call to the call center may includes access information to facilitate routing a message back to the mobile device via SMS, USSD or other network signaling technologies. The call center employs a software application to direct mobile equipment, so that it automatically processes requests it receives from mobile devices.

Enhancing Voice Calls

Figure 7A:
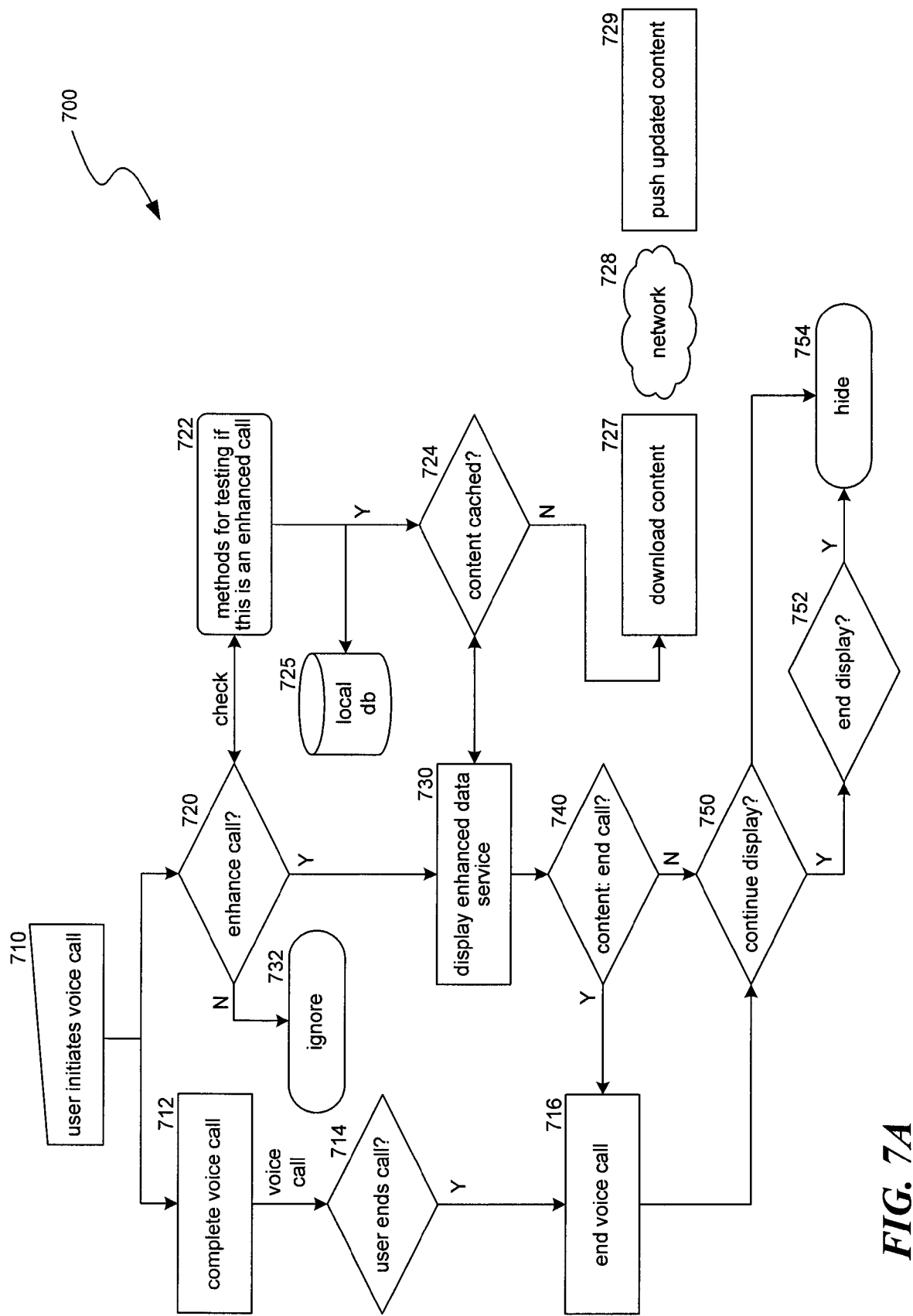
FIG. 7A illustrates a routine for intercepting a voice call and providing enhanced data services.

Referring to FIG. 7A, a flow diagram illustrating a routine 700 for intercepting voice calls and providing enhanced services is shown. In block 710, the system receives an indication of a user-initiated voice call. Once the voice call is initiated, the routine 700 proceeds to block 712 (for the voice connection aspect of the call) and to block 720 (for possible enhancements to the call). The system, in block 712, completes, connects, or establishes the voice call. The system maintains the voice call until, in decision block 714, the system receives an indication that the user has ended the voice call. If the system receives the indication, the routine 700 proceeds from decision block 714 to block 716, and the system ends the voice call.

Before, during, or after completion of the voice call, as in block 712, the system, in block 720, decides if the voice call is to be enhanced. The system proceeds through some or all of a number of different methods, such as in block 722, in determining whether or not to enhance a call. These methods will now be discussed with respect to FIG. 7B.

Figure 7B:
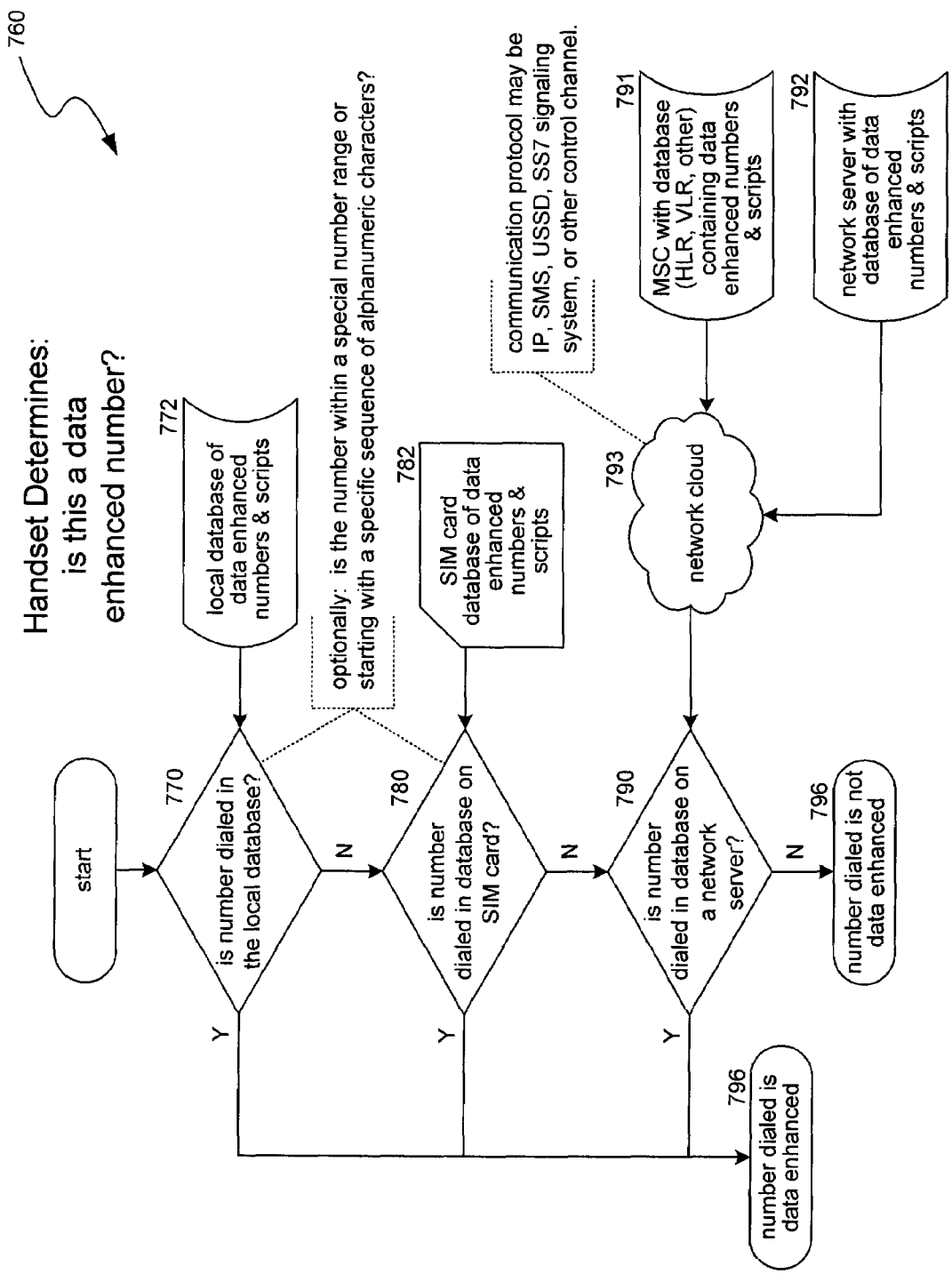
FIG. 7B illustrates a routine for determining data services for a voice call number.

Referring to FIG. 7B, an example process flow for determining if a dialed number supports enhanced data capabilities, such as in block 722, is shown as routine 760. Upon detecting a dialed number or initiated voice call, the system, in block 770, looks to a local database 772 of data enhanced numbers and scripts and attempts to match the number with one of the locally stored numbers. Alternatively, or additionally, the system may compare the dialed number with a range of numbers (such as a range of numbers known to be data enhanced) or may look to the number itself (such as looking at the number for a specific sequence of alphanumeric characters). The dialed number may be of a recognizable voice number format, or may be any other alphanumeric inputs.

The database 772 may be in the local memory of the mobile device (or elsewhere, as noted below). The system may periodically update the database 772 after data workflow changes, data communications, and so on.

If the system matches the dialed number to a number stored in the local database 772 (or matches a range of numbers or numbers having a certain sequence of characters), the routine 760 proceeds to block 795 and the system determines the dialed number is voice enhanced.

If the number is not stored in the local database 772 (or, does not otherwise indicate data enhancement), the routine 760 proceeds to block 780. In block 780, the system looks to a database 782 of data enhanced numbers and scripts contained on a SIM (or UICC) card and attempts to match the dialed number with one of the numbers stored in the SIM card database 782. Further details with respect to the storage of numbers and/or scripts on SIM cards are discussed in commonly assigned U.S. Provisional Patent Application No. 60/849,390, entitled "SIM BASED METHODS, SUCH AS REMOTE LOGISTICS MANAGEMENT AND CONFIGURATION USING SIM BASED APPLICATIONS", filed concurrently herewith. Of course, numbers and scripts could be stored elsewhere, such as other local databases or databases connected via wired or wireless connections (e.g., on a laptop or on a gaming device in communication with the device).

If the dialed number is matched to a number stored in the SIM database 782 (or is matched to a range of numbers or numbers having a certain sequence of characters), the routine 760 proceeds to block 795 and the system determines the dialed number is data enhanced.

If the number is not stored in the SIM database 782 (or, does not otherwise indicate data enhancement), the routine 760 proceeds to block 790. In block 790, the system looks to a database 791 and/or a database 1192 contained at a network server and attempts to match the dialed number with a number stored in one of databases 791, 792. The system may connect with the databases over a network 793, such as the Internet or other networks. The system may look to a public database, such as a mobile service center (MSC) having a database 791. Database 791 may be an HLR, a VLR, or any private or public databases. The system may also look to a server specific database 792 (such as a network database, workflow database, and so on) that contains additional known data enhanced numbers and scripts.

If the system matches the dialed number to a number stored in one of the network databases 791, 792, the routine 760 proceeds to block 795 and the system determines the dialed number is voice enhanced. If the number does not match, the routine proceeds to block 796, and the system determines the dialed number is not voice enhanced.

Referring back to FIG. 7A, the system, in decision block 720, uses routine 760 to determine if the initiated voice call supports data enhancements. If the system determines the initiated voice call does not support data enhanced services, the routine proceeds to block 732, and proceeds as a typical voice call, effectively ignoring any data enhancement aspects. However, if the system, in block 1722 and FIG. 7B, determines the initiated voice call supports data services, the routine 710 proceeds to block 730, and the system displays the enhanced services. The system may, in decision block 724, check for content 727, may download or otherwise obtain content from other non-local databases 729 via a network 728. The system may display content stored in both the local database 725 and one or more remote databases 1729.

Upon displaying the content, the system, in decision block 740, determines if the voice call is to end. If the system determines the call is to end, routine 700 proceeds to block 716, and the system ends the call. The system may determine to end the call from the displayed content, from user input, and so on. If the voice call is to remain connected, routine 1110 proceeds to decision block 750, and the system determines whether or not to continue displaying the content. The system may then end the display (block 752), hide the display from the user (block 754) or continue displaying the enhancements to the user. The system may choose one or more of these options depending on user input, on the type of displayed enhancement, on duration of the voice connection, on a lack of user activity with respect to the displayed content, and so on.

Furthermore, in some cases, routine 700 may proceed from block 716 (when the system ends the voice call) directly to block 750 (when the system decides to continue or end displaying enhanced data services). These cases will be discussed in greater detail below with respect to FIG. 9.

Thus, the system enables the call interception methods described herein to provide data services to voice calls having such capabilities. The system may provide data services such as visually displayed content to a user. The content may be retrieved from a local cache of content stored in the mobile device or pushed to the mobile device from a service provider when requested.

Referring to FIGS. 8A-8B, display screens illustrating an example of an enhanced data call are shown. For example, a user would like to order a pizza, and inputs the number of their favorite pizza delivery establishment, "Pizza Delivery Express." In FIG. 8A, display screen 800 depicts the user's main background screen 820 as well as the number "1-800-PIZZA-ME (749-9263)" 810. Once dialed, the user's mobile device completes the voice call to 1-800-749-9263.

After completion of the voice call, the device determines that the dialed number supports enhanced data services, and initiates a request for content. The system may use some or all of the enhanced number lookup methods discussed herein.

In addition, the system may encode a token in the dialing string that indicates that the following dialed inputs are part of an enhanced data link identification. For example, a dialed string such as "1-800-749-9263*669" may relate to retrieving enhanced content from URL "http://www.18007499263*669."

After receiving the enhanced content from Pizza Delivery Express, the device displays the content to the user of the mobile device. For example, FIG. 8B provides screens 830 and 840 as examples of displayed content to the user. In this example, the system first displays screen 830 to the user. Screen 830 includes content related to available pizza sizes 835. Upon receiving a selection from the user, the system may then show screen 840, having content related to types of pizza toppings 845. The display may be remotely updated as the user makes verbal requests over the voice connection (of course, requests may also be voice or key press inputs). In these cases, the screens serve to illustrate available choices to the user (similar to giving the user a menu at the restaurant). Once the user makes choices, the called party (in this example, an employee at the restaurant) pushes content to the user's mobile device causing the user's mobile device to update the display. Additionally, or alternatively, the system may receive selections from the use via soft key or hard key inputs. In these cases, the user may choose via the displayed content.

Figure 8C:
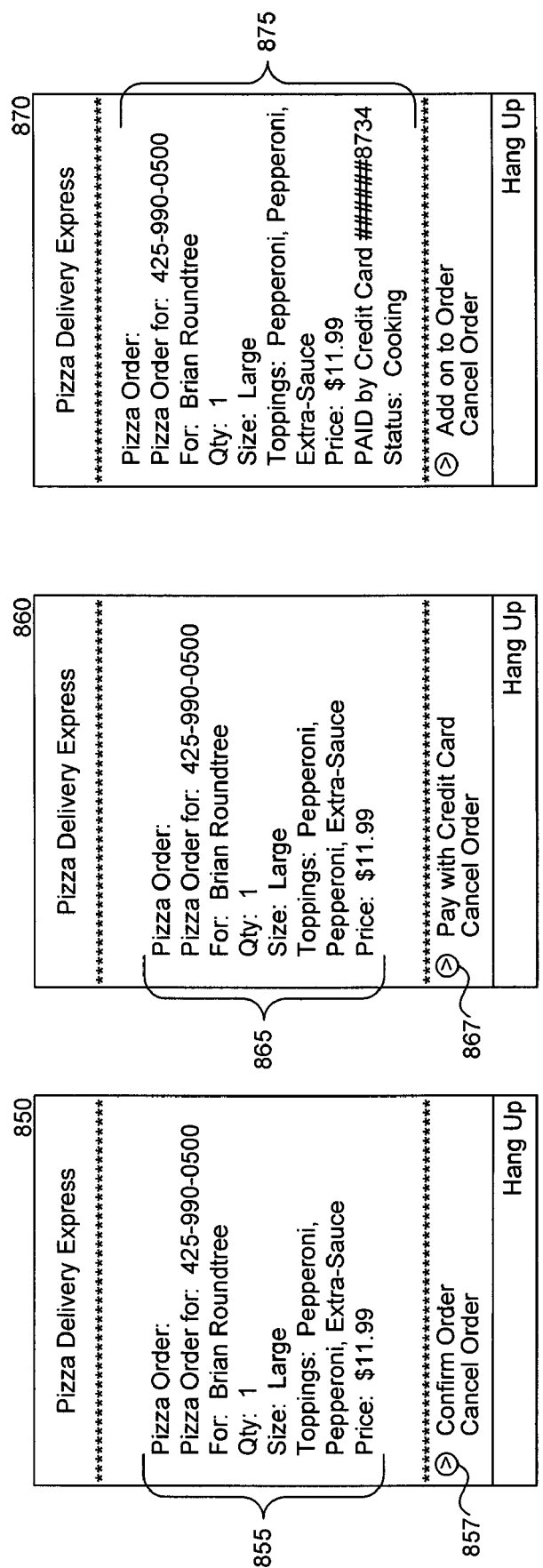

Once the user has made his/her selections (in this example, the user selects one large pepperoni pizza with extra sauce), the system may push content to the user's device to display results of the order, as shown in FIG. 8C. In screen 850, the system displays the user's order details 855. The user may confirm the order verbally, or may input their confirmation via soft button 857. In this example, the system then displays (via screen 860) the confirmed order details 865 and requests payment. Again, the user may provide information (such as the credit card number, a PIN number, and so on) either vocally or via the key entry 867. Once payment is received and the transaction is complete, the system may display a confirmation screen 870 that shows the order and payment details 875. The system may then end the call and remove the display. However, the system may also end the voice call, and update the display based on status of the user's order (such as provide a display showing the order as "in preparation," in transit," "delivered," "transaction complete," and so on). The system may then throw away or save any or all displays, depending on user preferences.

As mentioned herein, in some cases, the system terminates a completed voice call once the system determines the dialed number supports data enhancements. In these cases, the system uses the dialed number to trigger a data enhancement script (such as the scripts discussed above) to load and run, enabling the system to display content without an established voice connection.

Figure 9:
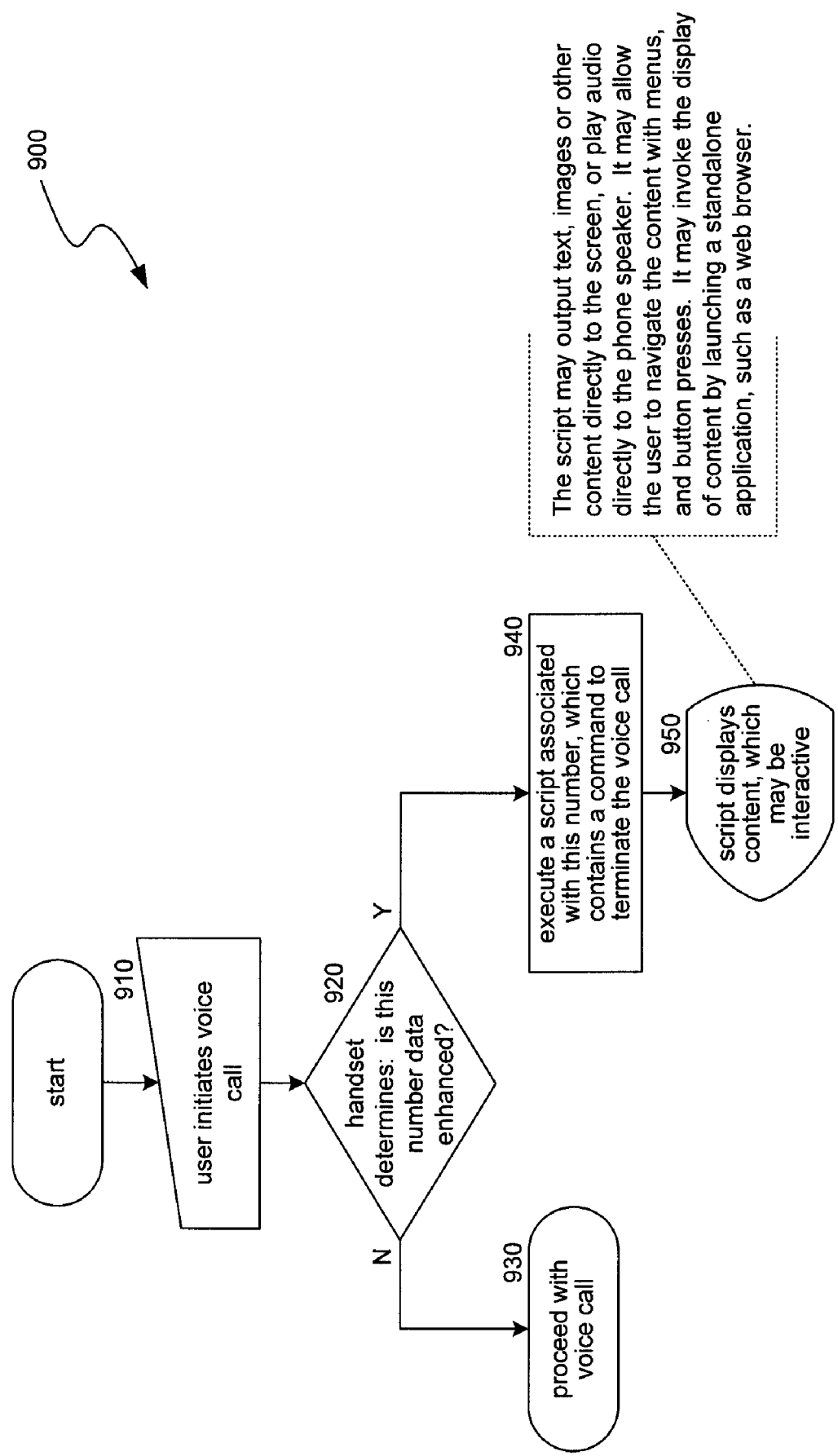
FIG. 9 illustrates a routine for triggering data services from initiated voice calls.

Referring to FIG. 9, a flow diagram illustrating a routine 900 for triggering data services from initiated voice calls is shown. In block 910, the system receives an indication of an initiated voice call (such as a user dialing a phone number). Before, during or after completion of the voice call, the system, in decision block 920, attempts to determine if the dialed number supports data services. The system may employ the methods discussed with respect to FIG. 7B or otherwise herein. If the system determines that the dialed number does not support data services, routine 900 proceeds to block 930, and the system completes the call as a normal voice call, else the routine proceeds to block 940.

In block 940, the system may execute a script associated with the dialed number (or, associated with similar numbers). The script may then end the voice call and begin displaying content to the user, as in block 950. The content may be, for example, similar to the content discussed with respect to FIGS. 8A-8C. The script may output text, images, or other content to a display screen of the user's device. The script may play audio via the device's speakers. The script may allow user interaction via menu navigation, button presses, voice recognition, and so on. The script may launch a web browser or other standalone application. An example of such content will now be discussed.

Figure 10:
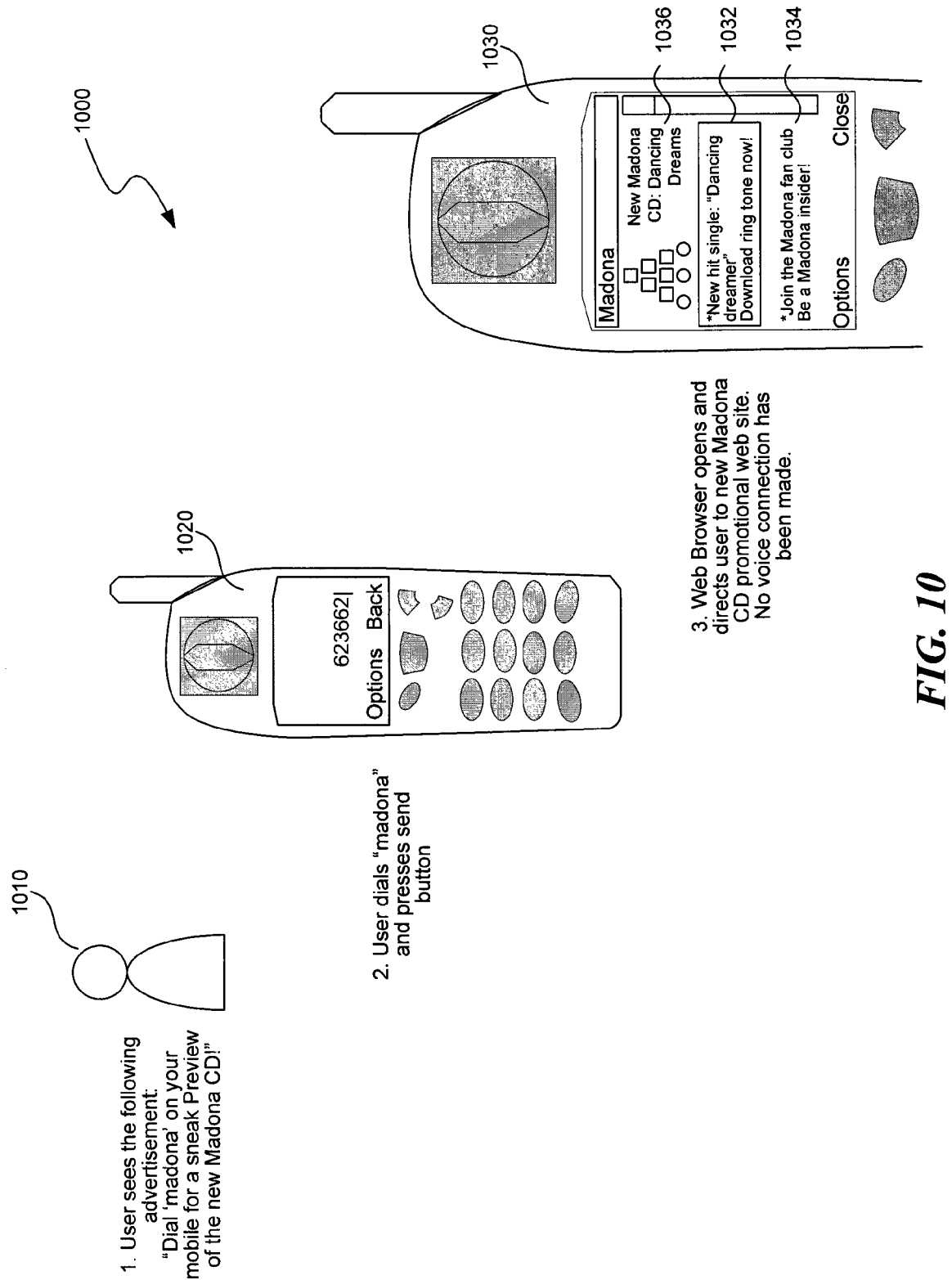
FIG. 10 shows display screens illustrating an example of providing data services without a voice connection.

Referring to FIG. 10, display screens illustrating an example of providing data services without a voice connection are shown. For example, a user 1010 sees an advertisement to "Dial 'MADONA' on your mobile phone for a sneak preview of her new CD!" The user inputs M-A-D-O-N-A into his/her phone (screen 1020), and presses the send button. Before a voice connection is made, the system launches a web browser corresponding to the dialed number (e.g. http://www.madona*669.com), shown in screen 1030. The web browser provides information related to the advertisement, such as available ringtones 1032, fan club information 1034, CD information 1036, and so on. The system, therefore, provides content to a user without establishing a voice connection.

In some examples, the system may provide displayable or other data content to a user during a voice call that is related to content or subjects discussed during the call. For example, the user may wish to order an item from a called party, and want to see a picture of the item. A representative, in voice communications with the user, may receive the request from the user and send a picture of the item over a data channel during the voice call. In some cases, the system may use voice recognition software or other similar software to determine the user is asking about a requested item from the called party, retrieve a picture related to the requested item and transmit the picture to the called party.

Identifying a Mobile Device Via a Called Number

In some examples, the system is able to recognize a mobile device from information received via a called number, such as a customer service number. The system may provide information in or with the called number via a unique identifier, enabling a customer service representative to receive information about the mobile device when called.

A unique identifier is any string of digits or values capable of identifying a mobile device from other mobile devices. The system may generate a unique identifier in a variety of ways, or utilize device related identifiers. In some cases, the system may use a mobile device identifier such as an International Mobile Equipment Identity (IMEI) or an Electronic Serial Number (ESN). An IMEI is an identifier of a GSM device unique across all GSM devices, and may be 16 decimal digits long. An ESN uniquely identifies a CDMA phone and may be 10 digits long. In other cases, the system may use the mobile device's phone number as a unique identifier.

In some cases, the system may generate identifiers. For example, a server associated with a service provider or manufacturer of the mobile device may generate identifiers and communicate them to the device over a data channel. The server may generate identifiers in a variety of ways that enable the identifier to act as a database key. For example, the server may generate a sequence of numbers as the identifier.

Figure 11:
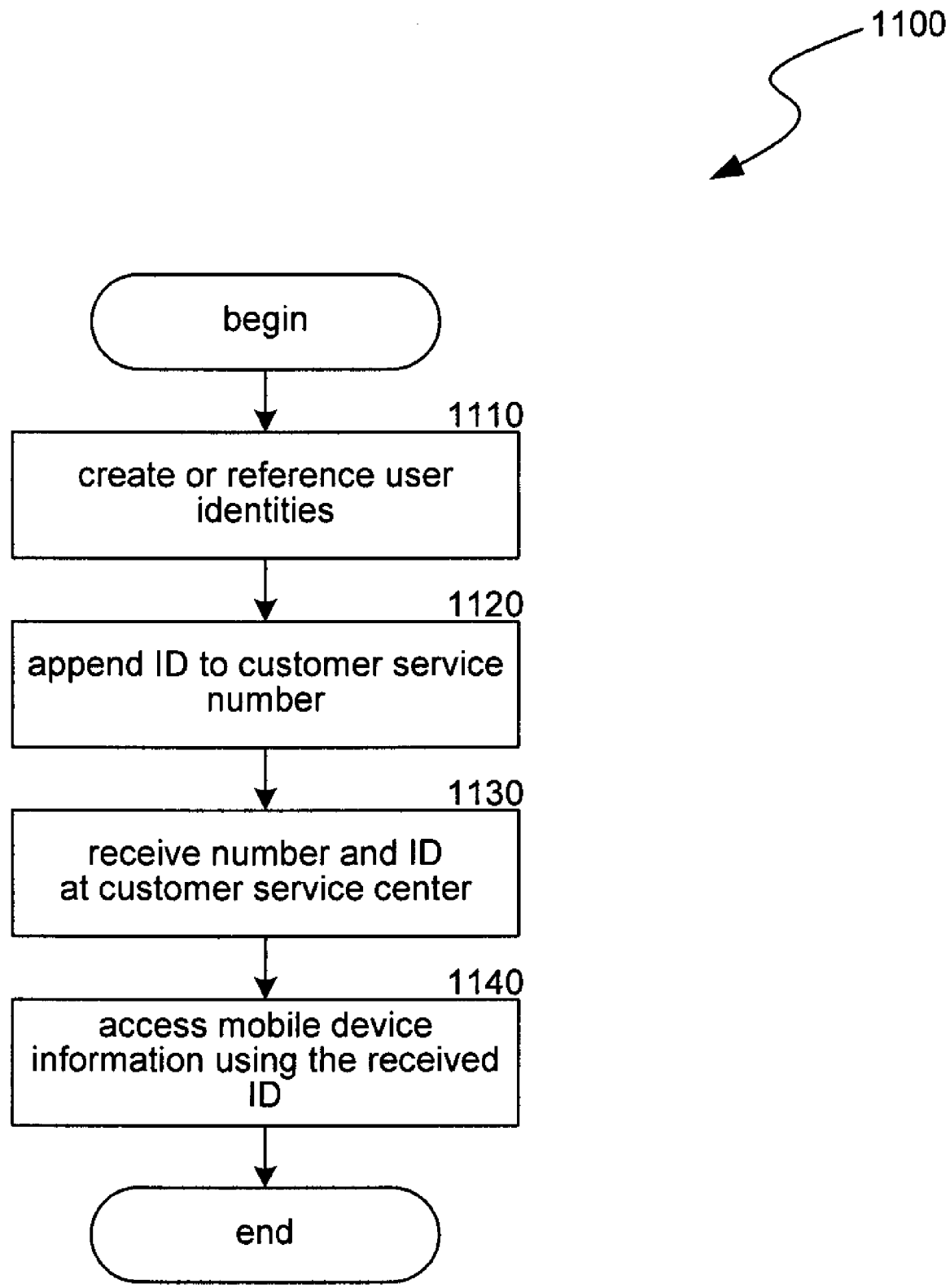
FIG. 11 illustrates a routine for accessing mobile device information via user identification.

Referring to FIG. 11, a routine 1100 for accessing mobile device information via user identification is shown. In step 1110, the routine creates or retrieves a unique identifier, such as a global unique identifier (GUID) upon initiation of a voice call from a user. In some cases, the system may determine the user has dialed a customer service number using the call intercept methods described herein, and initiate a script to retrieve the unique identifier for the user.

In step 1120, the system appends the unique identifier to the dialed customer service number and places the voice call. In some cases, the system appends the unique identifier to all dialed numbers. In some cases, the system appends the unique identifier to numbers associated with facilities capable of processing extended numbers. An extended number may refer to a number containing the dialed number of a called party plus an appended unique identifier. In some cases, the system uses some of the methods described herein to determine if the number is capable of receiving extended numbers.

In step 1130, the system receives the extended number at a customer service center (or other facility). In step 1140, the system accesses information about the device related to the received unique identifier. The system may receive such information before the call was received and may retrieve such information using the unique identifier. For example, the system may contain a database relating unique identifiers for mobile devices and corresponding status or other reporting information. Upon receipt of a call and appended unique identifier, the system is able to match the received unique identifier with a similar stored unique identifier and retrieve information about the mobile device. The retrieved information may be diagnostic information retrieved from the device or received from the device. For example, the system may launch or run a script on the device that performs diagnostics or other information gathering and transmits such information to the database. The system may then relate the transmitted information to a unique identifier of the device and store the information in the database. Thus, the system enables a representative at a customer service center to receive dynamically or recently updated information about the characteristics or status of a mobile device (and/or associated calling party) before a voice conversation occurs.

Customer service calls may be shorter and more effective as a result of representatives receiving information from the user identifiers, as they may be able to diagnose problems without receiving much information from users. For example, a service provider may modify or selectively determine what information to retrieve upon receipt of a unique identifier. They may use historical information about previous calls, historical information about the device or caller, or may determine the information most useful to their representatives.

Figure 12:
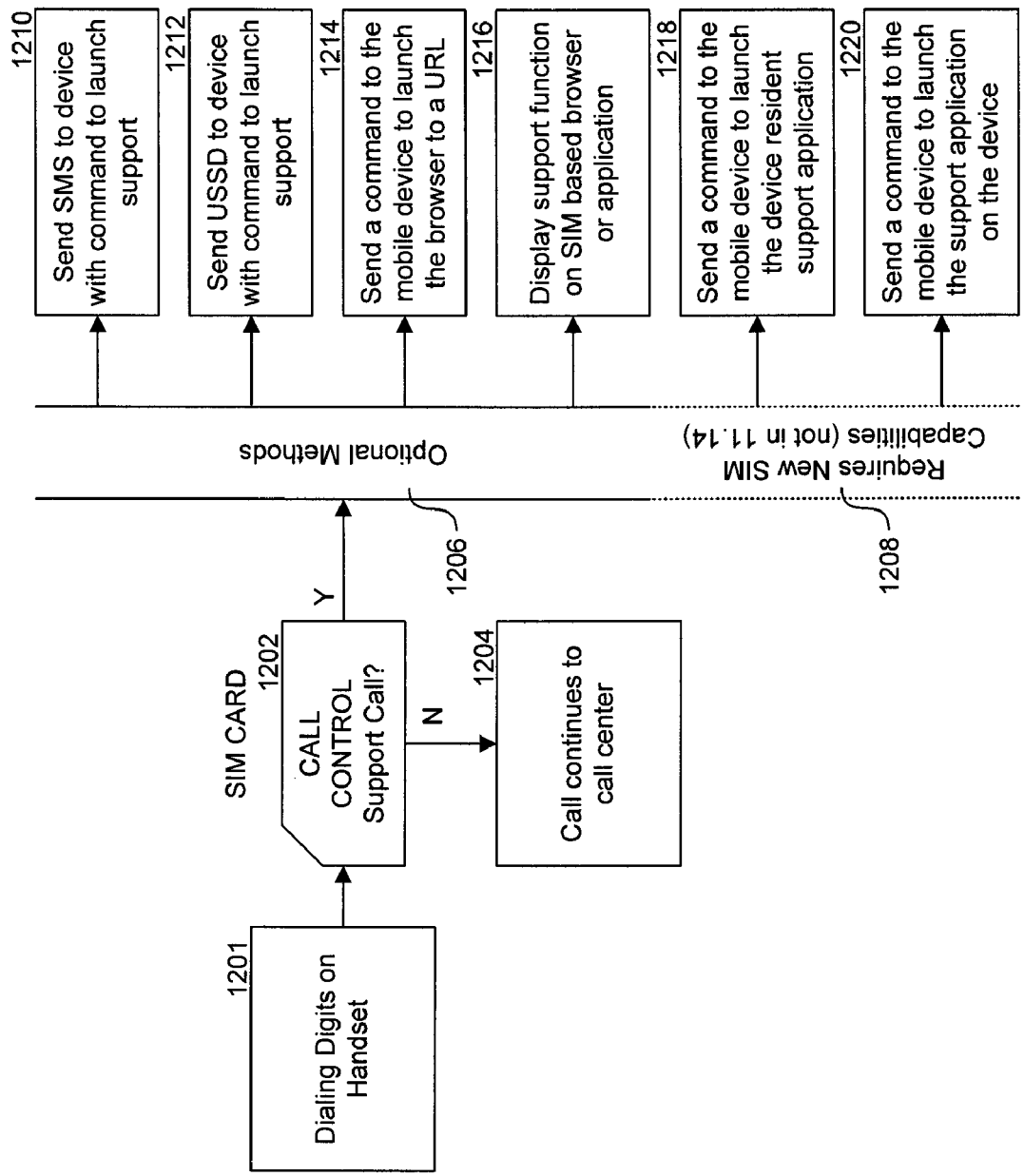
FIG. 12 illustrates a routine for intercepting and redirecting a customer service support call from the mobile device using the call control capabilities of the SIM/USIM (Universal Subscriber Identity Module).

In some examples, the SIM/USIM (Universal Subscriber Identity Module) on the mobile device may be used to intercept and to redirect customer service support calls. FIG. 12 illustrates a routine for intercepting and redirecting a customer service support call from the mobile device using the call control capabilities of the SIM/USIM (Universal Subscriber Identity Module). This alternative embodiment uses built-in capabilities of a 3GPP TS 11.14 compliant (or similar) SIM or USIM to perform call control to generically reroute calls for support back to the handset via SMS, supplementary service control strings, and/or other network and handset based control commands. This allows for routing calls without altering handset dialing programs.

As shown in FIG. 12, the subscriber first dials a number on the mobile device (block 1201). If the dialed number does not match a number stored on the mobile device, then the call continues to the call center without interruption (block 1204). If the dialed number matches a number stored on the mobile device, then the SIM card on the mobile device intercepts and redirects the call to the mobile device (block 1802) using SMS, supplementary service control strings, network and mobile device based control commands, and others.

In one embodiment, the SIM card may send a command via SMS to the mobile device to launch a support application (block 1210). In another embodiment, the SIM card may send a command via USSD (unstructured supplementary service data) to the mobile device to launch a support application (block 1212). In yet another embodiment, the SIM card may send a command to the mobile device to launch a browser to a URL (block 1214). In an alternative embodiment, the SIM card may display a support function on a SIM based browser or application (block 1216). In addition, mobile devices with advanced SIM capabilities may send a command to the mobile device to launch a resident support application (block 1218), or send a command to the mobile device to launch a support application on the device itself (block 1220).

Network-based services 204 may automatically query, set, save, and restore settings on the mobile device and SIM card or perform other functions. Alternatively, or additionally, the mobile device may locally perform diagnostic scripts on the device to gather user, device, and network data. Such scripts may be loaded over the air (OTA), and may be so loaded at any point, or initiated from a call center agent desktop computer. By either agent or mobile device initiation, diagnostic scripts on the phone are automatically initiated proactively to resolve problems encountered by the subscriber. In one embodiment, the mobile device or the call center agent can collect, via scripts, all the required information over the air without asking the subscriber.

The system may also resolve handset issues and record how the matter was resolved. The network service provider may provide proactive diagnostics to automatically correct top call-driven configuration issues to correct such problems and reduce the number of calls by subscribers to the customer support line.

Figure 13:
FIG. 13 is an example of a computer display showing device information and configuration data as used by a call center agent.

Referring to FIG. 13, an example of a computer display showing device information and configuration data as used by a call center agent is shown. While on a call with a subscriber, the agent can, from his or her desktop computer, send diagnostic commands over the air to the mobile device. In response, the mobile device retrieves or gathers diagnostics and status information and sends them back to the agent's computer, via the network. In this way, agents are able to quickly correct issues on the first call with the subscriber, and the subscriber is never asked to perform tedious tasks or asked to call back on a land line. For instance, network-based services 204 will not need to ask a subscriber to remove their battery to provide mobile device identification data since the data will be reported automatically to the network-based services in real-time.

As can be seen from FIG. 13, the system can automatically display, on a computer to a call center agent, detailed information regarding the mobile device and its owner. A web browser or customer service display 13 includes a menu of options 1312, report and history portion 1308 (e.g., APN list, memory analysis, applications list, etc.), the name of the mobile device owner, the owner's account number and phone number, MSISDN (Mobile Station Integrated Services Digital Network) number, international mobile subscriber identity (IMSI), and details regarding the phone itself, such as the manufacturer, model number, firmware version, serial number, and IMEI (International Mobile Equipment Identifier). Other tabs, when selected, display the history of the handset, as well as other handsets associated with the subscriber, phone numbers, SIM, etc. As also shown in FIG. 13, the system can display a media file count 1310 representing different types of files (e.g., photos, audio, video), the location of those files, the total number and size of the files, and so forth.

Thus, network-based services 204 may use a standard web browser to interact with reports and to remotely issue commands from the network browser to the mobile device. In this manner, the network-based services 204 or the call center agent can remotely monitor subscriber and mobile device activities, thereby notifying the subscriber when problems occur, rather than when they are reported by the subscriber.

Possibly more importantly, the call center agent, via the system, can initiate actions on the mobile device via his or her computer. For example, as shown in the media display portion 1310, the call center agent may select a "Select" button to perform a "Move files to Memory Card" function that permits the call center agent to move files from the embedded memory on the mobile device to a removable memory card in the device. Other options include initiating a local multimedia messaging service (MMS) guide for the subscriber, moving photos to an online photo album, showing subscriber audio analysis, and so forth. Likewise, the call center agent can select an appropriate button in the report/report history portion 1308 to access a list of available IP network access point names, analyze how memory is currently being used on the mobile device, list applications currently loaded and/or running on the mobile device, count media file types (as shown in portion 1310), and list the content of an application registry for the functionality described above.

Figure 14:
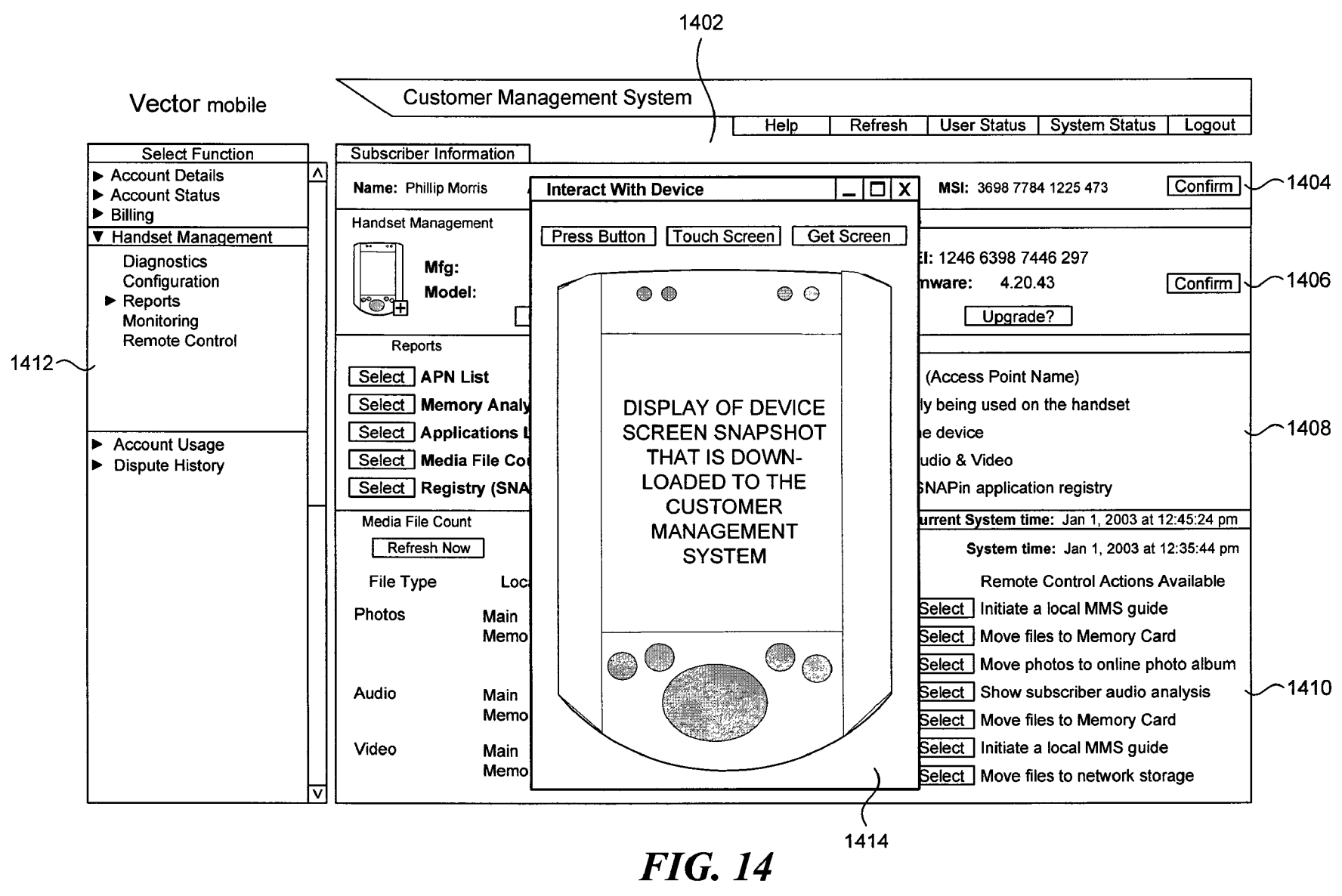

By clicking on a small image 1402 of the mobile device shown in the display 1302, the call center agent's computer displays a pop-up window 1404 featuring an enlarged image of the mobile device that includes current contents of the mobile device's display, as shown in FIG. 14. The call center agent or customer service representative may then interact with the image of the mobile device in the window 1404 to remotely and virtually actuate buttons on the mobile device, including sending touch screen commands to the mobile device if that device has a touch screen. This allows the call center agent to take temporary control of the device for diagnostic or configuration purposes.

Figure 15:
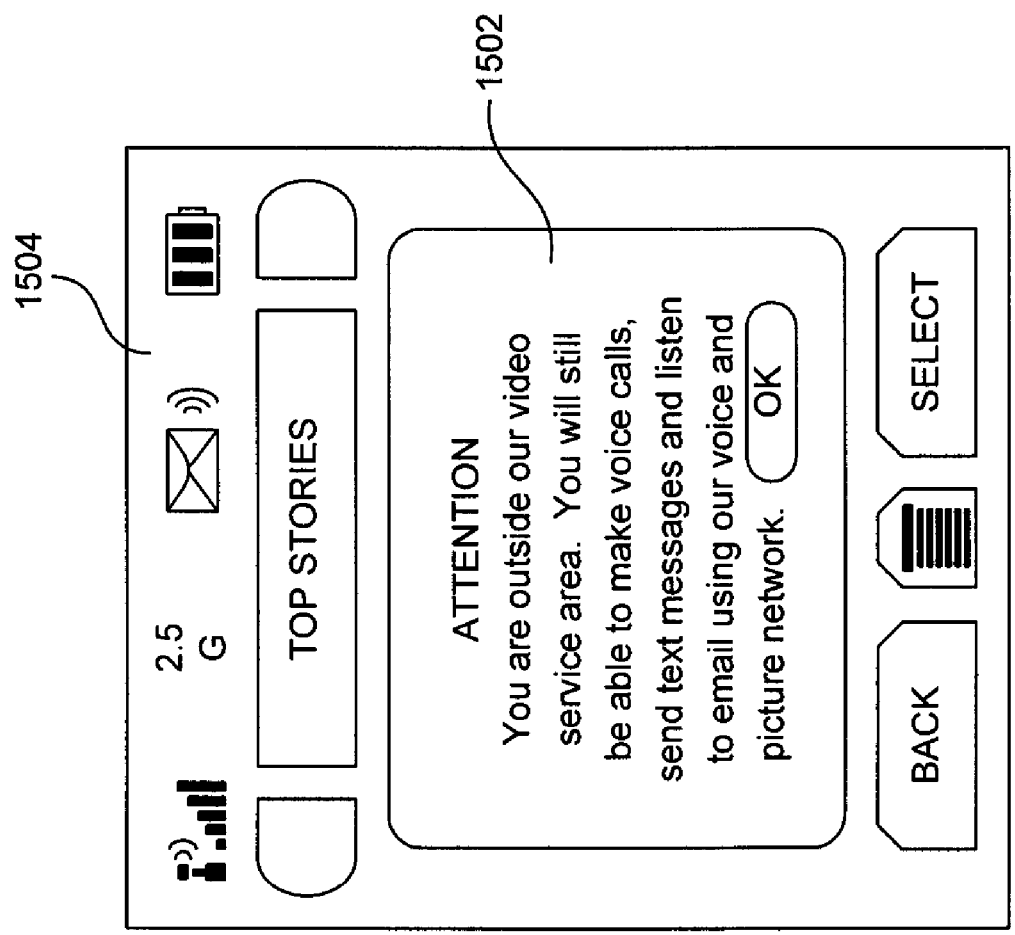
FIG. 15 is a mobile device display screen illustrating a proactive notification message to a subscriber regarding network changes.

One example of remotely initiating actions or providing remote data to the mobile device is shown in FIG. 15 where the mobile device performs active monitoring of the device itself, via an appropriate script or mobile device application to monitor a change in network availability and status. The device application on the subscriber's mobile device can automatically monitor device settings, configurations, network availability, and network status. The mobile device may thus respond to a network event, such as roaming into a 2.5G type network, which causes a locally stored script to alert the user. In the example of FIG. 15, the mobile device has roamed outside of a video service area, and thus the subscriber cannot send or receive videos. However, a script on the mobile device provides notice to the subscriber indicating that voice calls, text messages, and many other lower bandwidth applications are still available. The mobile device script displays an instructive dialog 1502 on the display 504. Such a helpful message to the subscriber can avoid costly calls to the support center when users may have attempted to send or receive videos outside the service area. The mobile device script may also log and report events or errors. In addition, the mobile device application may also automatically re-configure the mobile device while roaming or may add a new network configuration. (The terms mobile device "script" and "application" may at times be used interchangeably herein, as those skilled in the art will recognize.)

A system including the network-based services 204 and the mobile device 100 may be used to collect and to summarize data or metrics from the mobile device. Mobile device activity can be automatically logged and captured for periodic reporting to the network-based services. Collected data may be used to determine which applications are being used and how often users are accessing them. The collected data can be used with performance engineering systems and can gather business intelligence from rich device resident data or metrics The gathering of such mobile device metrics begins by the network operator defining data for collection. All mobile device activities can be locally logged or cached on the mobile device and periodically provided back to the network. Such logged data can include network events and messages. Over-the-air scripts provided by the network operator to the mobile device can instruct the device on what metrics to gather and with what frequency. For example, the service provider may program the mobile device to periodically (e.g., monthly) report to the network a status of installed executable program and their functional status. The status of the executable programs can be performed via an API (application programming interface) function called by the reporting system.

Through these scripts stored on the mobile device, user and network data is stored locally for periodic reporting, and the collection may conform to the network operator's privacy policy, while being invisible to the subscriber. Available database and reporting tools may import and use the periodically reported data. Such reporting tools may generate reports formatted for including business intelligence and data warehouse or data mining. As a result, such data easily augments network performance engineering systems. In general, the following is a list of some metrics that may be collected from mobile devices, although many others are possible: owner information, phone settings, IMEI, battery level, battery level history, % time charger connected, volume level, ring tones, profile use history, number or history of hard resets, count of contacts, installed applications, network settings, signal strength, radio frequency, tower ID, carrier ID, visiting carrier ID, base station history, carrier ID history, phone number, voicemail number, handset ID, camera capable, SIM ID, audio recording capable, screen resolution, screen color depth, operating system (OS) version, date and time, email configuration, hardware make/model, firmware version, audio playback capabilities, language, memory and % memory used, connection state or type of connection used, volume levels, backlight on/off, sound events, profiles, SIM contacts, turn device powered down, device hibernate, security settings, key pad lock, profiles, and SIM lock. Access to any of this data is scriptable so that the network service provider may decide what metrics to gather from what mobile devices. The service provider may also capture activities (e.g., applications started, network status, cell tower ID) and create standardized scriptable functions that can be combined to create a context sensitive service for the user.

In some examples, the system may expand the use of an interactive voice recognition (IVR) system. The system may gather or receive data or other information from workflow system or other network elements, and provide the data to a representative or IVR system upon receiving a call from a mobile device.

Figure 16:
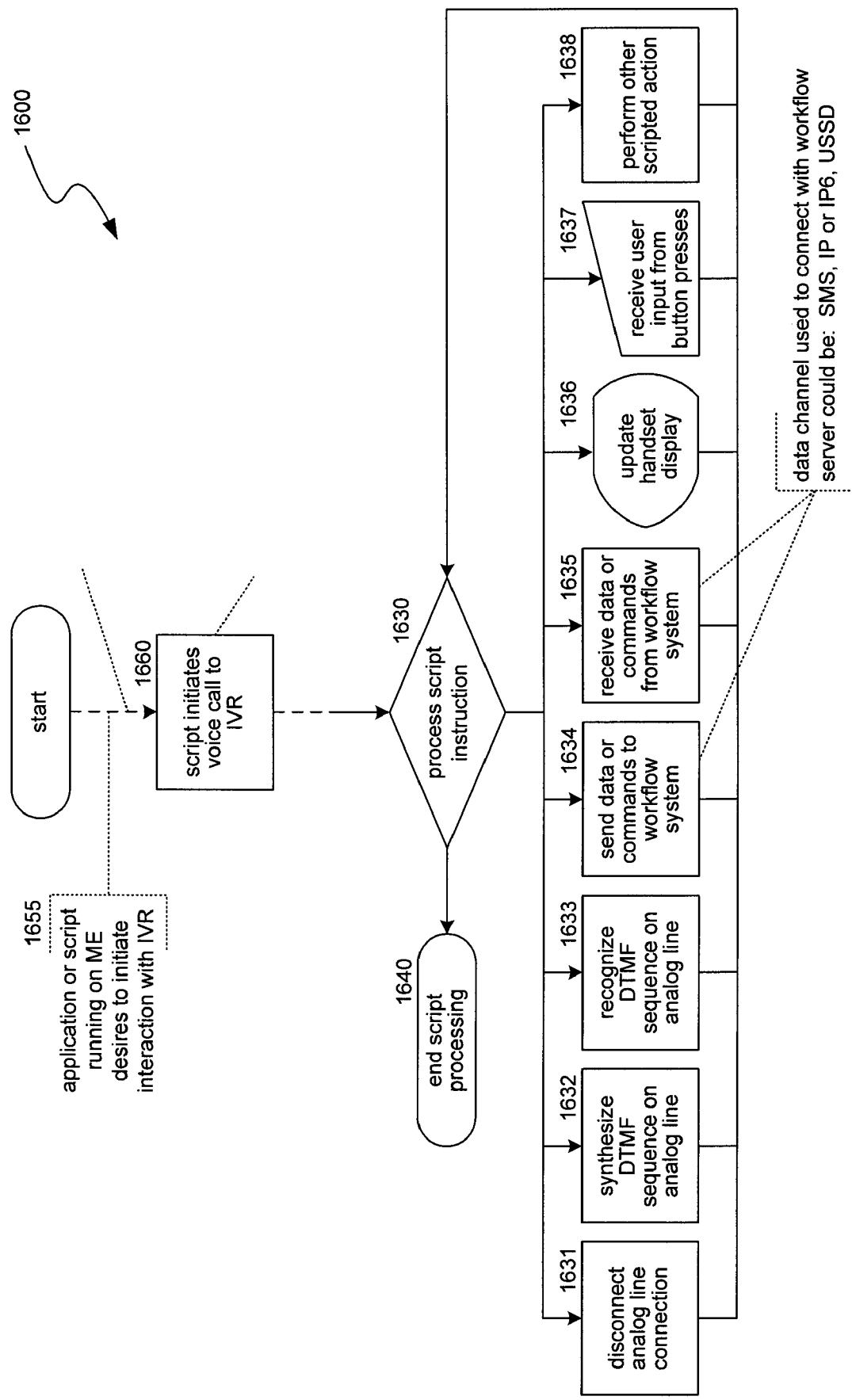
FIG. 16 is a process flow illustrating an alternative interaction between scripts running on a mobile device and an interactive voice recognition system.

Referring to FIG. 16, a process flow illustrating an alternative interaction between scripts running on a mobile device and an interactive voice recognition system is shown as routine 1600. In this example, in block 1655, an application or script running on a mobile device wishes to interact with an IVR system. In some cases, prior to initiating the call, the system may communicate with a workflow system to send device diagnostic information to a server over a data channel, such as a server related to a customer service center. For example, a script running on the mobile device may determine an incorrect configuration and attempt to correct the configuration automatically without alerting the user or a customer service agent. In block 1660, the system initiates a voice call to the IVR system, and the routine proceeds to block 1630, where the script processing described herein begins. In some cases, when initiating the voice call, the system may append additional digits to a dialed number, such as the unique identifiers described herein.

In block 1630, the system processes script instructions. In processing script instructions, the system may perform some or all of the actions or functions described in blocks 1631-1638. The system may perform the described actions in various sequences and orders, other than those shown in the Figure.

The system may, in block 1632, synthesize a DTMF sequence on an analog line. The system may, in block 1633, recognize and/or interact with a DTMF sequence on an analog line. The system may, in block 1634, send data or commands to a workflow system. The system may, in block 1635, receive data or commands from a workflow system. In sending and/or receiving data or commands from a workflow system, the system may connect with a workflow server over a number of data channels, such as an SMS channel, an IP or IP6 channel, a USSD channel, and so on.

The system may, in block 1636, update a display or other GUI on or related to the mobile device. For example, the system may present a user with a menu on the GUI. The system may, in block 1637, receive user input from button presses, soft button presses on a GUI, and so on. In block 1638, the system may perform other scripted or enhanced actions (such as other actions described herein). Additionally, the system may, in block 1631, disconnect an analog connection line as one of the actions. Once script instructions are processed and actions are performed, the routine proceeds from any or all of blocks 1631-1638 to block 1640, and the system ends script processing.

Figure 17:
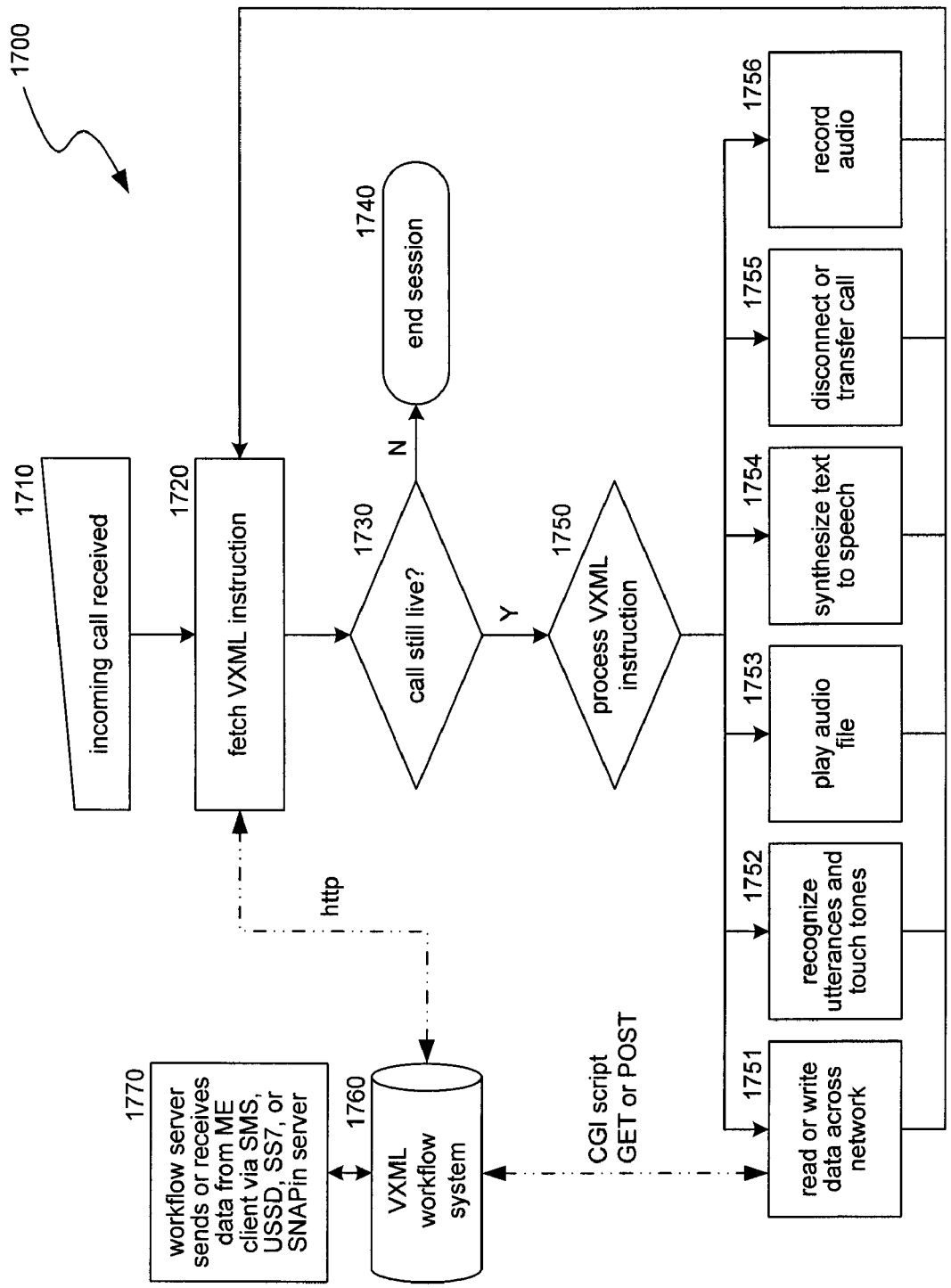
FIG. 17 is a process flow illustrating interactions between a workflow system and other network elements upon receiving a call from a mobile device.

Referring to FIG. 17, a process flow illustrating interactions between a workflow system and other network elements upon receiving a call from a mobile device is shown as routine 1700. In block 1710, the system receives an incoming call, such as a call from a mobile device running an IVR enhancement script. In block 1720, the system fetches instructions, such as VXML instructions. Although VXML instructions are shown in this example, the system may be implemented in other languages. In some cases, the system may communicate, via http or other channels, with a workflow system when fetching instructions. The workflow system, via a workflow server, may send or receive data from the mobile device over a data channel (such as an SMS channel, a USSD channel, an SS7 channel, an intermediate server such as network server, and so on).

In block 1730, the system determines that the incoming call is still connected, and proceeds to block 1750, else proceeds to block 1740 and ends. In block 1750, the system processes the fetched instructions. The processed instructions may initiate some or all of the actions shown in blocks 1751-1756. The system may initiate the actions in orders or sequences not shown in FIG. 17.

In block 1751, the instructions may cause the system to read or write data across the network. The system may use data sent or received in blocks 1760 and 1770 when reading or writing data. The system may also retrieve CGI scripts (such as those returned by GET, POST, and so on). Additionally, the system may perform other actions not shown in FIG. 17.

In block 1752, the instructions may cause the system to recognize received utterances and touch tones (such as DTMF Tones). Additionally, the system may recognize caller ID information or other extended digits, such as an added unique identifier. The system may then use the recognized digits to retrieve a data record from a workflow server.

In block 1753, the instructions may cause the system to play an audio file. In block 1754, the instructions may cause the system to synthesize text to speech. In block 1755, the instructions may cause the system to disconnect or transfer a call. In block 1756, the instructions may cause the system to record some or all of an audio stream. After performing some or all of the actions in blocks 1751-1756, the routine proceeds to block 1720 to await further instructions.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Further, the mobile device may employ many other locally stored applications beyond those described above. For example, the mobile device may include its own IVR system, rather than employing an IVR system at the call center. Thus, the subscriber navigates through a series of IVR menus to access desired information, some of which may be stored on the phone. However, one option in the local IVR could be to have the device place a call to the customer support call center.

In another alternative embodiment, the system may provide links to web pages supplied by the wireless service provider, where these links are to specific web pages directly addressing a need or question relevant to a current status of a user's mobile device. Such an alternative is useful when a mobile device has a web browser and sufficient data connection to the service provider's web server. Thus, a call intercept function on the mobile device may provide a link to a relevant web page, or even access that page automatically so that it is displayed to the user (rather than, for example, displaying locally stored content).

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the local-based support system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method for augmenting a voice call between a user of a mobile device and a called party capable of providing data content to the mobile device over a data communications channel, the method comprising:

receiving at the mobile device from the user a number indicating the voice call to be established with the called party over a voice communications channel, wherein the number is associated with the called party;

determining at the mobile device that the number contains a sequence of digits indicating the number is associated with a party capable of transmitting data content to the mobile device over the data communications channel;

establishing the voice call to the called party over the voice communications channel; and upon determining that the number contains the sequence of digits indicating the number is associated with the party capable of providing data content to the mobile device over the data communications channel, launching an application locally stored on the mobile device, wherein the locally stored application receives the content associated with the called party; and concurrently displaying the received content to the user during the established voice call, wherein the displayed content complements the voice call.

2. The method of claim 1, wherein determining that the number contains a sequence of digits indicating the number is associated with the party capable of providing content to the mobile device over the data communications channel comprises matching the number to a particular number stored in a database contained in the mobile device.

3. The method of claim 1, wherein determining that the number contains a sequence of digits indicating the number is associated with the party capable of providing content to the mobile device over the data communications channel comprises matching the number to a particular number stored in a database contained in a subscriber identity module within the mobile device.

4. The method of claim 1, wherein determining that the number contains a sequence of digits indicating the number is associated with the party capable of providing content to the mobile device over the data communications channel comprises determining that the sequence of digits fall within a range of digits that including the sequence of digits.

5. The method of claim 1, wherein determining that the number contains a sequence of digits indicating the number is associated with the party capable of providing content to the mobile device over the data communications channel comprises matching the number to a particular number stored on a network server associated with the mobile device.

6. The method of claim 1, further comprising:
receiving input from the user at the mobile device, wherein the input is received in response to the displayed content and is related to the displayed content.

7. The method of claim 1, further comprising:
receiving input from the user at the mobile device, wherein the input is received in response to the displayed content and is related to the displayed content; and
transmitting the received input to the called party over the data communications channel.

8. The method of claim 1, further comprising:
automatically terminating the voice call in response to displaying the content to the user.

9. A computer-readable medium encoded with computer executable instructions that cause a mobile device to perform a method of providing content to a user of the mobile device, the method comprising:

receiving at the mobile device a user-input number indicating a voice call, wherein the user-input number is associated with a party capable of providing content to the mobile device over a data communications channel;

before connecting the voice call, determining at the mobile device that the number matches a particular number stored in the mobile device;

launching an application locally stored on the mobile device, wherein the locally stored application provides the content associated with the party upon detecting that the entered number matches the particular stored number;

terminating the voice call in response to launching the application; and displaying the content to the user via a visual display of the mobile device.

10. The computer-readable medium of claim 9, wherein the launched application is stored in a subscriber identity module in the mobile device.

11. The computer-readable medium of claim 9, wherein the provided content is stored in the mobile device before receiving the user-input number.

12. The computer-readable medium of claim 9, wherein the provided content is retrieved from the party after the application is launched.

13. A system for displaying content to a user of a mobile device during a voice call between the user and a called party, the system comprising:
- a number reception component, wherein the number reception component receives a phone number indicating a request to call the party over a voice communications channel;
- a services determination component, wherein the services determination component determines that the called party supports a content store associated with the phone number;
- a voice connection component, wherein the voice connection component establishes a voice connection between the user and the called party;
- a content retrieval component, wherein the content retrieval component retrieves content from the content store; and
- a display component, wherein the display component displays the retrieved content to the user during the voice connection.

14. The system of claim 13, wherein the services determination component is stored in a subscriber identity module contained in the mobile device.

15. The system of claim 13, wherein the content retrieval component is stored in a subscriber identity module contained in the mobile device.

16. The system of claim 13, wherein the content store is stored in a subscriber identity module contained in the mobile device.

17. The system of claim 13, wherein the content store is stored in a database contained in the mobile device.

18. The system of claim 13, wherein the content store is stored on a network server associated with the mobile device.

19. The system of claim 13, wherein the content store is stored in a database associated with the called party.

20. The system of claim 13, wherein the display component displays a menu of items to be selected by the user.

21. The system of claim 13, wherein the display component displays confirmation information in response to a user selecting an item from a menu of items over the voice connection.

22. A method of retrieving information associated with a mobile device, the method comprising:
- at a called party, receiving a voice call from a user of the mobile device, wherein the voice call is directed to a number associated with the called party;
- at the called party, determining that the number associated with the called party contains digits associated with a unique identifier of the mobile device;
- at the called party, matching the unique identifier to a unique identifier stored in a database relating unique identifiers to information associated with respective mobile devices;
- retrieving the information associated with the matched unique identifier; and
- presenting the retrieved information to an entity at the called party associated with the received voice call.

* * * * *